(12) United States Patent
Cho et al.

(10) Patent No.: US 9,578,543 B2
(45) Date of Patent: Feb. 21, 2017

(54) REDUCED OVERHEAD FOR WIRELESS COMMUNICATION

(71) Applicant: QUALCOMM Incorporated, San Diego, CA (US)

(72) Inventors: James Simon Cho, Mountain View, CA (US); Kevin Neal Hayes, Mountain View, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 190 days.

(21) Appl. No.: 14/289,535

(22) Filed: May 28, 2014

(65) Prior Publication Data

US 2015/0003235 A1    Jan. 1, 2015

Related U.S. Application Data

(60) Provisional application No. 61/841,915, filed on Jul. 1, 2013.

(51) Int. Cl.
*H04W 28/06* (2009.01)
*H04W 12/02* (2009.01)

(52) U.S. Cl.
CPC ............ *H04W 28/06* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,609,226 B1 * | 8/2003 | Figueira | 714/807 |
| 8,228,889 B2 | 7/2012 | Nishibayashi et al. | |
| 2003/0059052 A1 * | 3/2003 | Cheng | 380/274 |
| 2003/0210787 A1 * | 11/2003 | Billhartz et al. | 380/270 |
| 2003/0210788 A1 * | 11/2003 | Billhartz et al. | 380/270 |
| 2005/0232161 A1 * | 10/2005 | Maufer et al. | 370/252 |
| 2013/0044877 A1 | 2/2013 | Liu et al. | |
| 2013/0128808 A1 | 5/2013 | Wentink et al. | |
| 2013/0202111 A1 * | 8/2013 | El Gamal et al. | 380/270 |
| 2013/0215836 A1 | 8/2013 | Quan et al. | |
| 2014/0036775 A1 | 2/2014 | Asterjadhi et al. | |

* cited by examiner

*Primary Examiner* — Steven H Nguyen

(74) *Attorney, Agent, or Firm* — Arent Fox LLP

(57) ABSTRACT

Overhead associated with packet communication is reduced by combining or eliminating one or more fields of a packet. In some implementations, a reduction in overhead associated with packets employing security (e.g., IEEE 802.11ah packets) can be achieved by reducing overhead associated with verification-related fields. For example, a packet can include a merged frame check sequence (FCS) and an integrity check value (ICV). In some implementations, an FCS is omitted from a packet.

18 Claims, 19 Drawing Sheets

REDUCED OVERHEAD FOR WIRELESS COMMUNICATION

CLAIM OF PRIORITY

This application claims the benefit of and priority to commonly owned U.S. Provisional Patent Application No. 61/841,915, filed Jul. 1, 2013, the content of which is hereby incorporated by reference herein.

BACKGROUND

Field

This application relates generally to wireless communication and more specifically, but not exclusively, to reducing communication overhead.

Introduction

Communication networks enable users to exchange messages among several interacting spatially-separated devices. Communication networks may be classified according to geographic scope, which could be, for example, a wide area, a metropolitan area, a local area, or a personal area. Such networks may be designated respectively as a wide area network (WAN), a metropolitan area network (MAN), a local area network (LAN), or a personal area network (PAN). Communication networks also differ according to the switching technique and/or routing technique employed to interconnect the various network apparatuses and devices. For example, a communication network may use circuit switching, packet switching, or some combination of the two. Communication networks can differ according to the type of physical media employed for transmission. For example, a communication network may support wired communication, wireless communication, or both types of communication. Communication networks can also use different sets of communication protocols. Examples of such communication protocols include the Internet protocol (IP) suite, synchronous optical networking (SONET) protocols, and Ethernet protocols.

In general, wireless networks employ intangible physical media in an unguided propagation mode using electromagnetic waves in radio, microwave, infrared, optical, or other frequency bands. Consequently, wireless networks are better adapted to facilitate user mobility and rapid field deployment as compared to fixed, wired networks. For example, wireless networks readily support network elements that are mobile and have dynamic connectivity needs. The use of wireless networks also may be preferred for scenarios where it is desirable to provide a network architecture having an ad hoc topology, rather than a fixed topology.

A wireless network may be deployed on a planned or ad hoc basis to provide various types of services (e.g., voice, data, multimedia services, etc.) to users. In some implementations, one or more access points are deployed to provide wireless connectivity for access terminals (e.g., stations (STAs)) that are operating within a geographical area served by a wireless network. In some implementations, peer devices may establish a wireless network for communication between these devices.

In some scenarios, it is desirable to reduce the overhead associated with wireless communication. For example, the Institute of Electrical and Electronic Engineers (IEEE) 802.11ah standard is being developed to support sensor applications where the packet length is very short and aggressive power-save is desired. In sensor device applications, the overhead associated with a packet header (e.g., a media access control (MAC) header) may be significant compared to the size of the payload (e.g., which can be tens of bytes).

Various types of header compression have been proposed to reduce the size of packet overhead. A MAC-based packet employing security may include a MAC header, an initialization vector (IV) of eight bytes, an integrity check value (ICV) of eight bytes, and a frame check sequence (FCS) of four bytes. MAC protocol data unit (MPDU) header compression and security IV compression have been approved for IEEE 802.11-based (i.e., Wi-Fi) applications. In contrast, a proposal to reduce the size of the ICV has been rejected because some sensor use cases (e.g., a door lock sensor) may require the same level of security as other Wi-Fi use cases.

SUMMARY

A summary of several example aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to reducing overhead associated with packet communication. In some implementations, ICV overhead associated with packets employing security (e.g., IEEE 802.11ah packets) can be reduced. Here, an FCS and an ICV can be merged such that the overall length of the packet is reduced, without compromising the length of the ICV from a security point of view.

For example, a new ICV (FCS_ICV) may comprise a mixture (e.g., XOR) of four bytes of the ICV with the four bytes of the FCS. This technique provides the same number of bytes of ICV authentication protection as a conventional ICV technique. Accordingly the ICV length is not compromised from a security point of view.

As another example, an FCS and ICV merging scheme may use two fields instead of one field for the merged value. For example, one field may be based on a first subset of the ICV, while the other field may be based on a combination of the FCS and a second subset of the ICV.

In other implementations, reduced security overhead is accomplished by eliminating FCS for encrypted frames. FCS may be eliminated because data corruption will normally result in both ICV failure and FCS failure. Thus, FCS is redundant to some extent. The elimination of FCS may save, for example, four bytes in each packet.

Various aspects of the disclosure provide an apparatus configured for communication. The apparatus comprises a processing system configured to: generate a first value based on a subset of a data set, generate a second value based on the first value and all of the data set, generate a third value based on the first value and the second value, and generate a frame comprising the data set and the third value; and a transmitter configured to transmit the frame.

Other aspects of the disclosure provide a method of communication. The method comprises generating a first value based on a subset of a data set; generating a second value based on the first value and all of the data set; generating a third value based on the first value and the second value; generating a frame comprising the data set and the third value; and transmitting the frame.

Other aspects of the disclosure provide another apparatus configured for communication. The other apparatus comprises means for generating a first value based on a subset of a data set; means for generating a second value based on the first value and all of the data set; means for generating a third value based on the first value and the second value; means for generating a frame comprising the data set and the third value; and means for transmitting the frame.

Other aspects of the disclosure provide a non-transitory computer-readable medium. The computer-readable medium comprises code executable to generate a first value based on a subset of a data set; generate a second value based on the first value and all of the data set; generate a third value based on the first value and the second value; generate a frame comprising the data set and the third value; and transmit the frame.

Other aspects of the disclosure provide a wireless device. The wireless device comprises: an antenna; a processing system configured to: generate a first value based on a subset of a data set, generate a second value based on the first value and all of the data set, generate a third value based on the first value and the second value, and generate a frame comprising the data set and the third value; and a transmitter configured to transmit the frame via the antenna.

BRIEF DESCRIPTION OF THE DRAWINGS

These and other sample aspects of the disclosure will be described in the detailed description and the claims that follow, and in the accompanying drawings, wherein:

Figure 1:
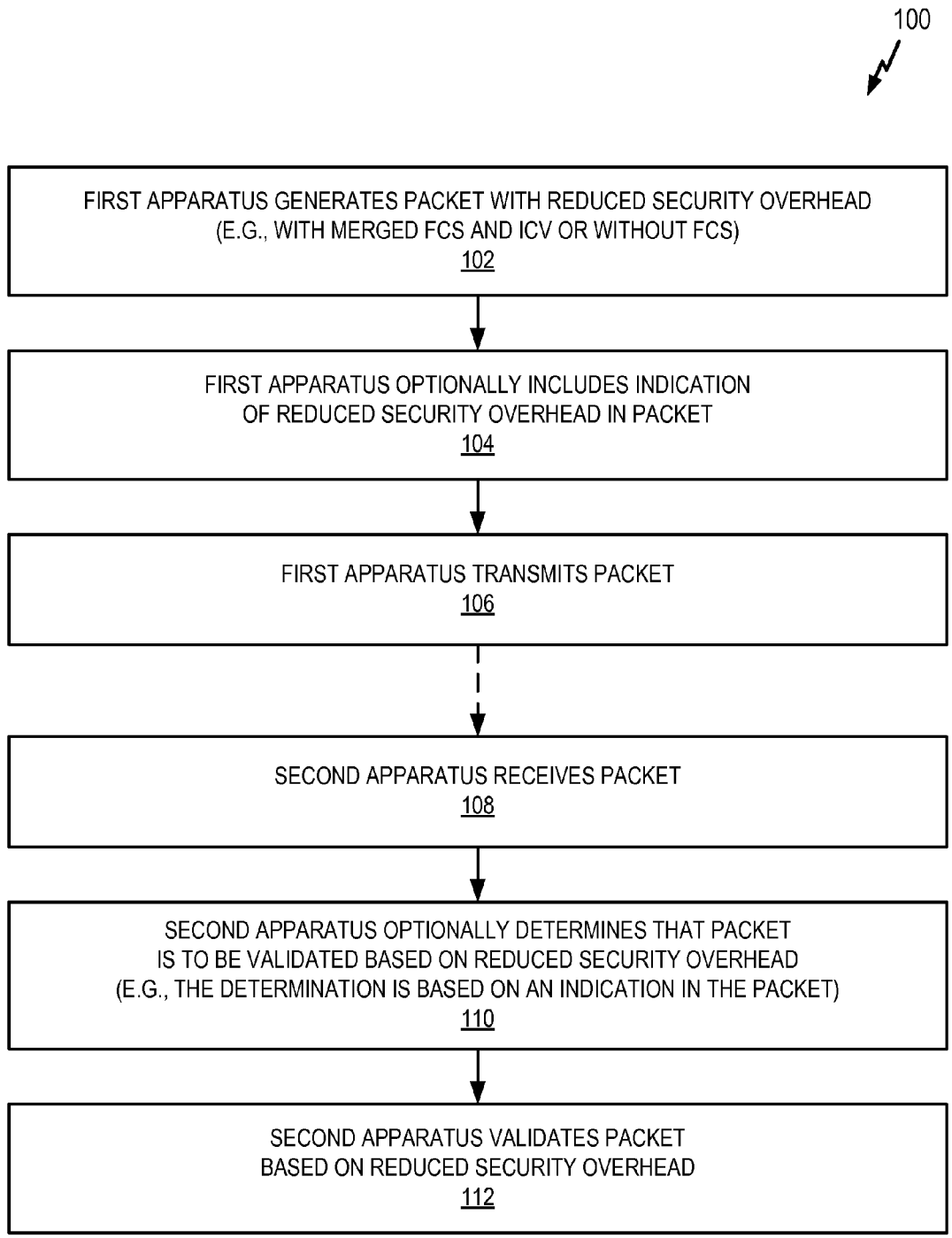
FIG. 1 is a flowchart of several sample aspects of operations relating to use of reduced security overhead in accordance with some aspects of the disclosure.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect disclosed herein may be embodied by one or more elements of a claim. As an example of the above, in some aspects, a method of wireless communication may comprise generating a first value based on a subset of a data set; generating a second value based on the first value and all of the data set; generating a third value based on the first value and the second value; generating a frame comprising the data set and the third value; and transmitting the frame. In addition, in some aspects, the first value may comprise an integrity check value (ICV) and the second value may comprise a frame check sequence (FCS).

FIG. 1 illustrates a process 100 for reduced security overhead communication between apparatuses. For purposes of illustration, certain aspects of such communication may be described herein in the context of an IEEE 802.11-based system. It should be appreciated, however, that the teachings herein may be implemented using other types of components, using other types of communication technology, and using other nomenclature. Also, one or more of the operations disclosed herein may be described as being performed by a specific apparatus. It should be appreciated, however, that these operations may be performed by different types of apparatuses in different implementations. Also, the operations may be performed using a different number of apparatuses in different implementations. For example, one apparatus may perform a first subset of the operations and pass the result of those operations to another apparatus that performs a second subset of the operations. Also, it should be appreciated that one or more of the operations described herein might not be employed in a given implementation.

As represented by block 102, a first apparatus generates a packet with reduced security overhead.

In some implementations, reduced security overhead is accomplished by merging validation fields of a packet. For example, a packet could include an ICV with integrated FCS. Techniques involving merged validation fields are treated in more detail below in conjunction with FIGS. 2-11.

In some implementations, reduced security overhead is accomplished by eliminating FCS for encrypted frames. FCS may be eliminated because data corruption will normally result in both ICV failure and FCS failure. Thus, FCS is redundant to some extent. Techniques involving omitted FCS are treated in more detail below in conjunction with FIGS. 12 and 13.

As represented by block 104, the first apparatus may optionally include in the packet an indication that the packet supports reduced security overhead. For example, a bit in the packet header may indicate that FCS is not included in the packet or that a merged FCS and ICV is included in the packet. In the latter case, one or more bits also could be used to indicate the type of merging employed (e.g., employing one field or two fields).

As represented by block 106, the first apparatus transmit the packet. This packet is received at a second apparatus as represented by block 108.

As represented by optional block 110, in some implementations, the second apparatus determines that the received packet is to be validated based on reduced security overhead. For example, in a case where the second apparatus can accept packets with or without reduced security overhead, the second apparatus may determine at block 110 whether the received packet includes an indication that the packet supports reduced security overhead. If so, the second apparatus processes the received packet using a technique that accounts for this reduced overhead.

As represented by block 112, the second apparatus validates the received packet based on the reduced security overhead. In cases where the packet does not include an FCS, the second apparatus may validate the frame independent of considering an FCS (e.g., validation based solely on an ICV). In cases where the packet employs merged FCS and ICV, the second apparatus may employ a corresponding verification procedure.

Figure 2:
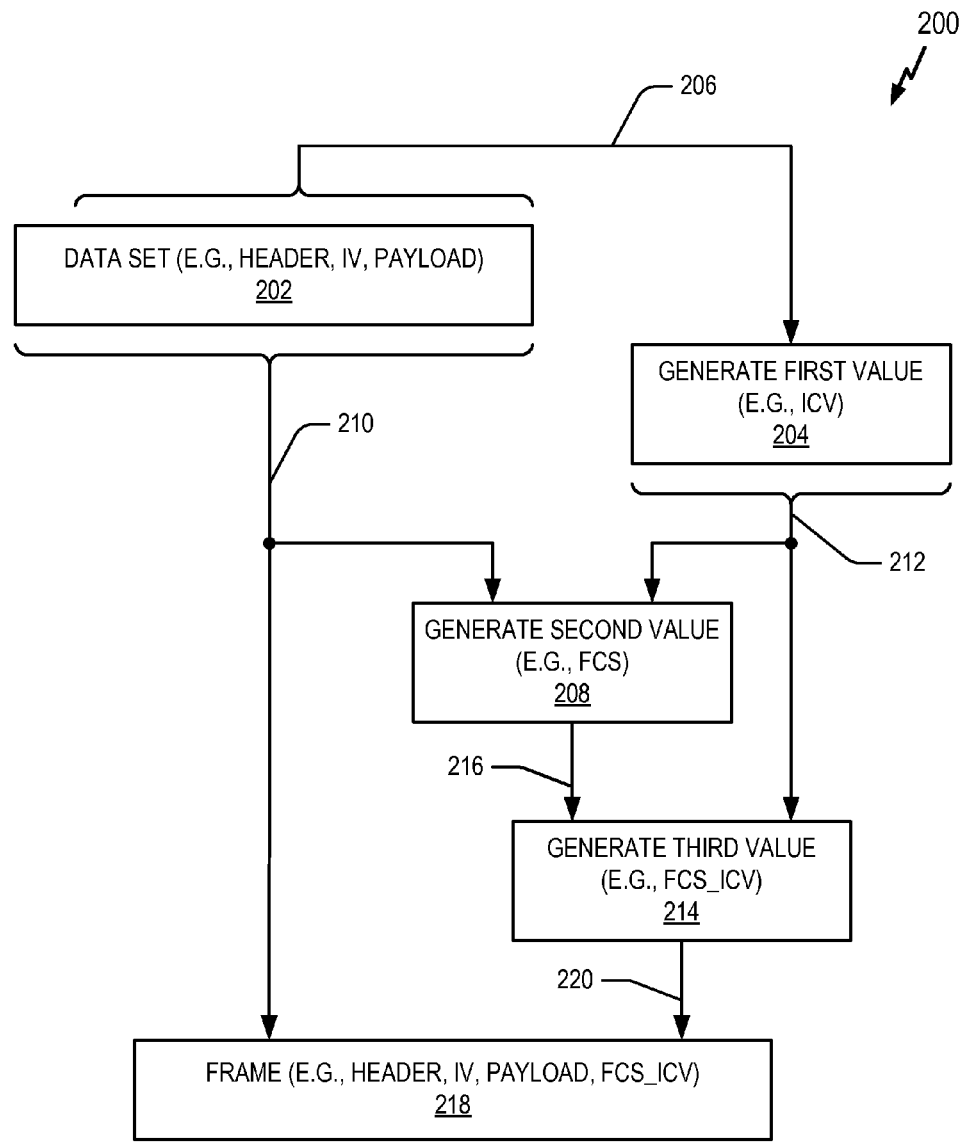
FIG. 2 illustrates an example of a technique for combining verification values in accordance with some aspects of the disclosure.

FIG. 2 illustrates a process 200 for generating a frame (e.g., a packet) by merging fields associated with a data set 202. In some implementations, the data set 202 includes a header, an initialization vector (IV), and a payload for a frame.

Initially, a first value is generated 204 based on the data set 202 (e.g., based on a subset of the data set 202) as represented by a first line 206. In some implementations, the first value is an ICV that is calculated according to the IV, the payload, and a subset of the header.

A second value is then generated 208 based on the data set 202 as represented by a second line 210 and based on the first value as represented by a third line 212. In some implementations, the second value is an FCS that is calculated according to the header, the IV, the payload, and the ICV.

Next, a third value is generated 214 based on the second value as represented by a fourth line 216 and based on the first value as represented by the third line 212. In some implementations, the third value is a merger of the FCS and the ICV (FCS_ICV).

Finally, a frame 218 is formed based on the third value as represented by a fifth line 220 and based on the data set as represented by the second line 210. In some implementations, the frame 218 includes the header, the IV, the payload, and the merged FCS and ICV (FCS_ICV).

Validation fields can be merged in various ways in accordance with the teachings herein. For purposes of illustration, two techniques for merging FCS and ICV will be described with reference to FIGS. 3-5 and FIGS. 6-8.

Figure 3:
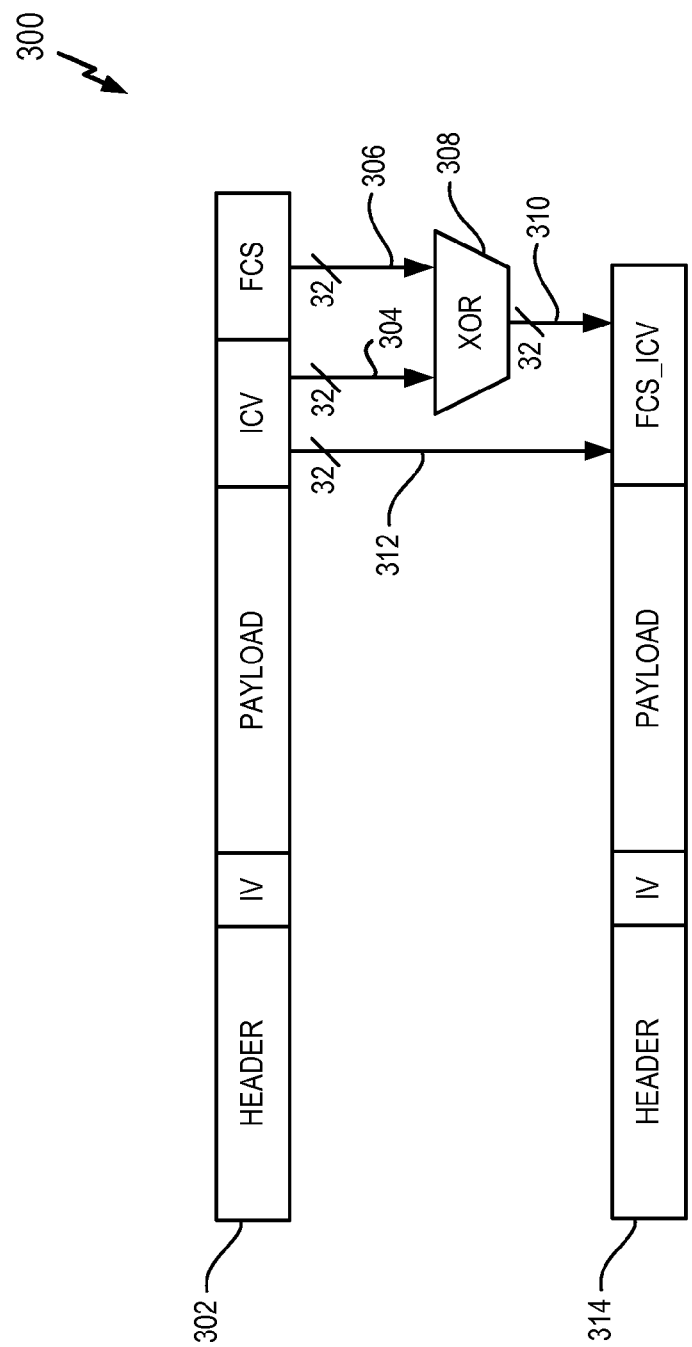
FIG. 3 illustrates an example of a technique where FCS and ICV are merged in accordance with some aspects of the disclosure.

FIG. 3 illustrates a process 300 for merging FCS and ICV. FCS and ICV are initially calculated for a media access control (MAC) frame 302 that includes a MAC header, an IV, and a payload. The ICV can be calculated (e.g., using a cryptography algorithm) over the MAC header, the IV, and the payload. Typically, one or more fields of the MAC header are skipped for the ICV calculation to improve system efficiency. The FCS can be calculated (e.g., using a polynomial-based algorithm) over the MAC header, the IV, the payload, and the ICV.

As represented by a first line 304 and a second line 306, respectively, four bytes (32 bits) of the ICV and four bytes of the FCS are inputs to an exclusive-OR (XOR) 308. The output of the XOR 308, represented by a third line 310, consists of four bytes that are then concatenated with the other four bytes of the ICV, represented by a fourth line 312, to provide a new ICV for a frame 314 to be transmitted.

The new ICV is referred to as FCS_ICV and consists of eight bytes. In some implementations, the four upper bytes of the ICV are XORed with all four bytes of the FCS. Thus, in this case, FCS_ICV={ICV [63:32]^FCS [31:0], ICV[31:0]}. This technique thus provides the same number of bytes of ICV authentication protection as a conventional ICV technique.

Figure 4:
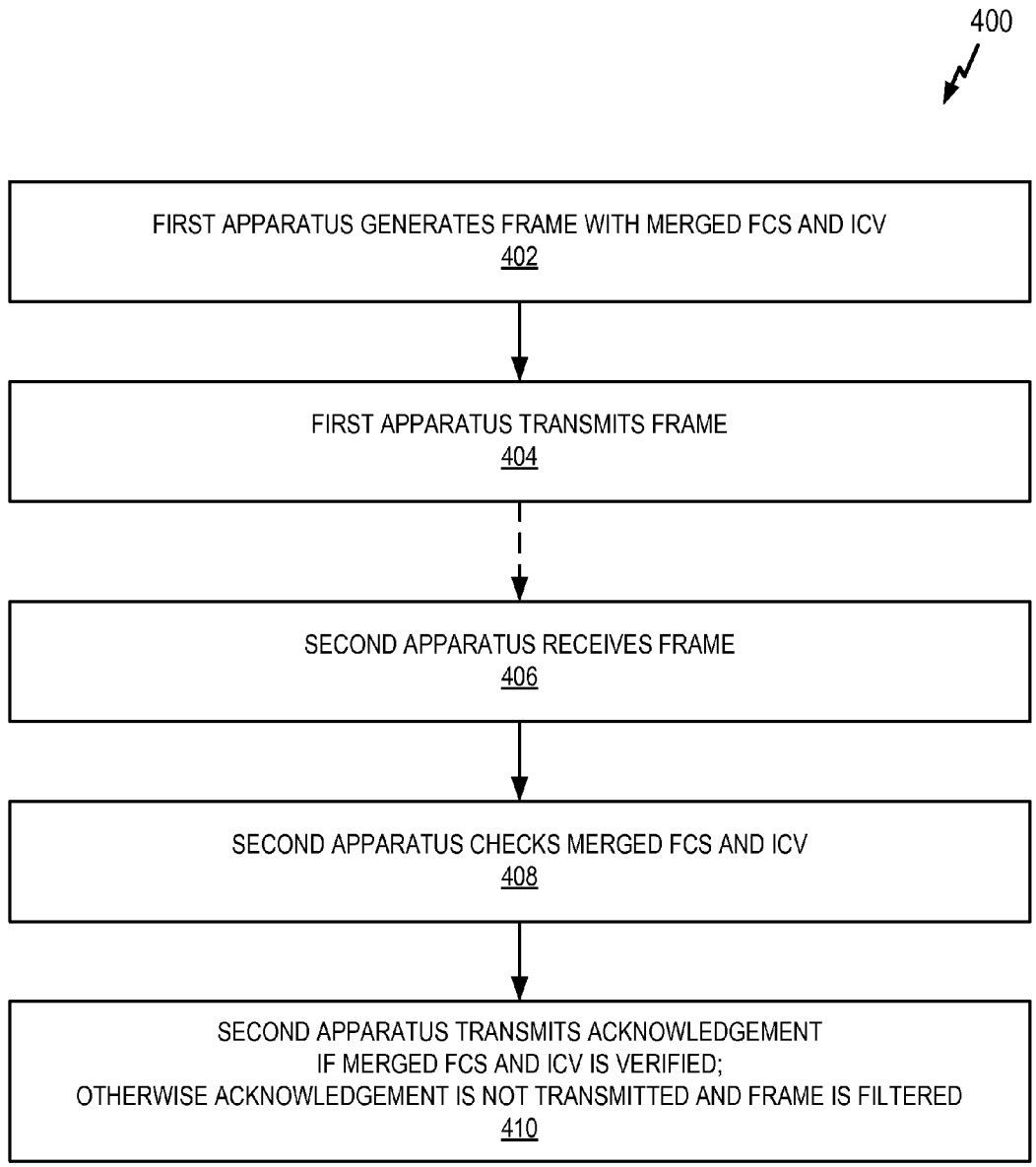
FIG. 4 is a flowchart of several sample aspects of operations relating to generating and processing a merged FCS and ICV in accordance with some aspects of the disclosure.

FIG. 4 illustrates a process 400 where a first apparatus transmits a frame that includes a merged FCS and ICV to a second apparatus. For purposes of this transmission, the first apparatus may thus be referred to as the transmitter and the second apparatus referred to as the receiver. The first and second apparatuses could be any combination of one or more access terminals (e.g., STAs), one or more access points (e.g., base stations), or one or more other type of communication node.

As represented by block 402, the first apparatus generates a frame that includes a merged FCS and ICV (FCS_ICV). For example, the operations of block 402 could correspond to the operations of the process 300 of FIG. 3.

As represented by block 404, the first apparatus transmits the frame generated at block 402 to a second apparatus. For example, the first apparatus could transmit the frame via an 802.11ah link.

As represented by block 406, the second apparatus receives the frame transmitted by the first apparatus at block 404.

As represented by block 408, the second apparatus checks the merged FCS and ICV to determine whether the frame was successfully received (e.g., received without error or with correctable errors). An example of such a check is described below in conjunction with FIG. 5.

As represented by block 410, if the merged FCS and ICV is successfully verified at block 408, the second apparatus transmits an acknowledgement to the first apparatus. In this way, the first apparatus is informed that the frame was successfully received.

If the merged FCS and ICV was not successfully verified at block 408, the second apparatus does not transmit an acknowledgement. In addition, the second apparatus filters (e.g., discards) the frame, such that the frame (or its contents) is not sent to a higher protocol layer at the receiver.

Figure 5:
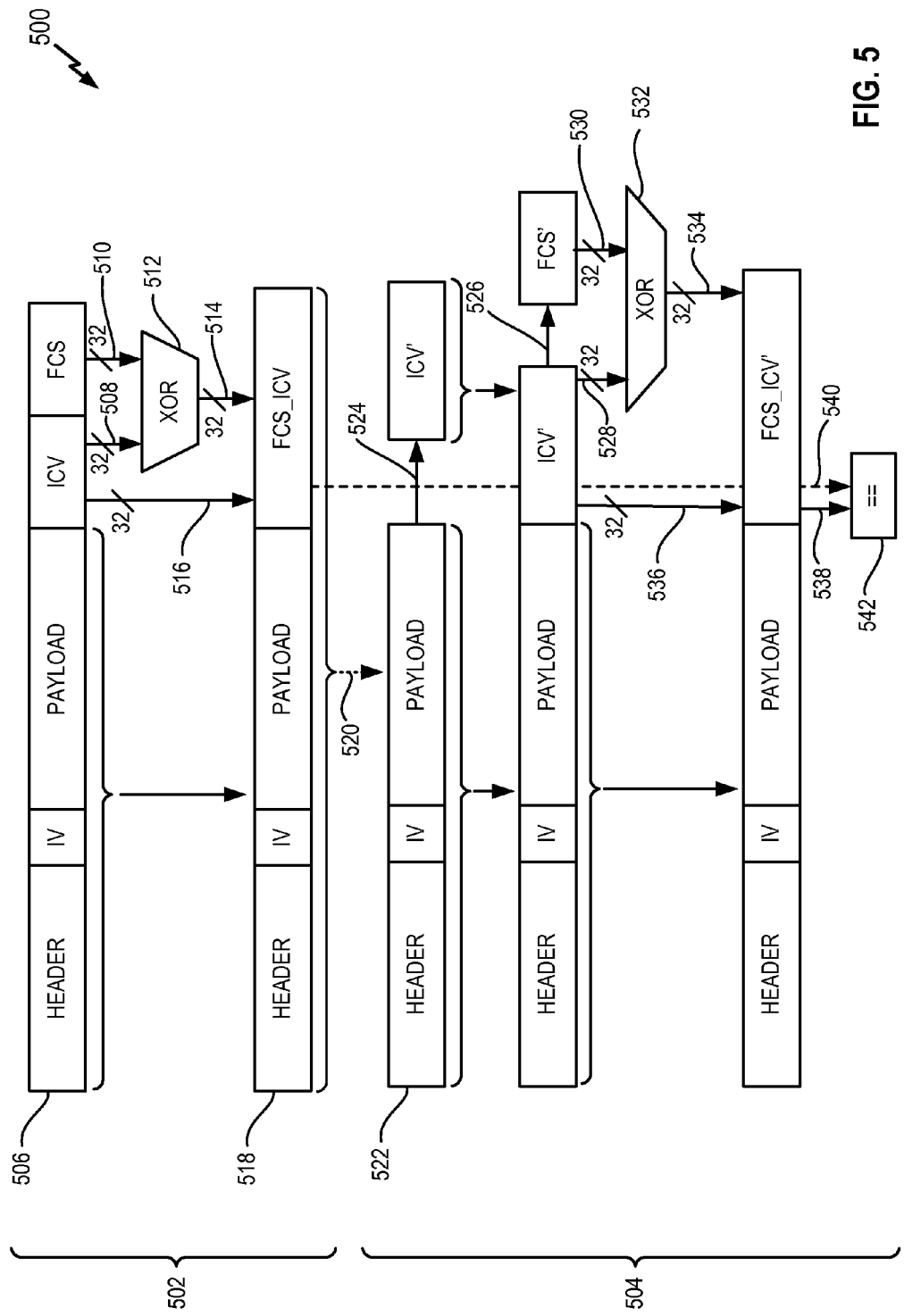
FIG. 5 illustrates an example of a verification technique in accordance with some aspects of the disclosure.

FIG. 5 illustrates a process 500 for verifying a merged FCS and ICV. For purposes of explanation, the process 500 shows the generation 502 of a frame at a transmitter and the processing 504 of the frame at a receiver.

The generation 502 of the frame corresponds to the process 300 of FIG. 3. Thus, FCS and ICV are initially calculated for a media access control (MAC) frame 506 that includes a MAC header, an IV, and an encrypted payload. The ICV is calculated based on the MAC header, the IV, and the payload. The FCS is calculated based the MAC header, the IV, the payload, and the ICV.

As represented by a first line 508 and a second line 510, respectively, the upper four bytes (32 bits) of the ICV and the four bytes of the FCS are inputs to an XOR 512. The output of the XOR 512, represented by a third line 514, consists of four bytes that are concatenated with the other four bytes of the ICV, represented by a fourth line 516, to provide FCS_ICV. The transmitter then transmits a frame 518 including the header, the IV, the payload, and the FCS_ICV via a wireless medium, as represented by a first dashed line 520.

At the receiver, the received FCS_ICV is compared to an FCS_ICV designated FCS_ICV' that is generated based on a received frame. If the FCS_ICV and the FCS_ICV' match, the frame is deemed to have been successfully received.

To this end, upon receipt of the packet, the receiver generates a new ICV designated ICV' based on the header, the IV, and the encrypted payload, as represented by a fifth line 524. The payload is decrypted to create clear text. The clear text is used to generate the unencrypted ICV. The ICV' is optionally encrypted if desired (e.g., if called for by an 802.11-based standard).

To reduce the complexity of FIG. 5, the FCS_ICV is not shown in the frame 522. It should be understood, however, that the frame 522 will include an FCS_ICV corresponding to the FCS_ICV of the transmitted frame 518.

An FCS designated FCS' is generated based on the header, the IV, the payload and the ICV', as represented by a sixth line 526. As represented by a seventh line 528 and an eight line 530, respectively, the upper four bytes (32 bits) of the ICV' and the four bytes of the FCS' are inputs to an XOR 532. The output of the XOR 532, represented by a ninth line 534, consists of four bytes that are concatenated with the other four bytes of the ICV', represented by a tenth line 536, to provide FCS_ICV'.

As represented by an eleventh line 538 and a second dashed line 540, respectively, the FCS_ICV' and the FCS_ICV received with the frame 522 are compared by a comparator 542. Thus, a determination is made as to whether the frame 522 has been successfully received and, depending on the results of this determination, the receiver may send an acknowledgement (e.g., a block acknowledgement) to the transmitter.

The merging of FCS and ICV discussed in FIGS. 3-5 may raise one or more issues in a given deployment. In a conventional FCS and ICV scheme, for either FCS failure or ICV failure, the receiver will silently filter (e.g., drop) the received packet. For FCS failure, the packet is filtered and an acknowledgement (ACK) is not sent. For ICV failure, the packet is filtered but the acknowledgement (to the FCS) is sent. Thus, the receiver silently drops ICV failure without any notification to the local stack or to the transmitter.

In contrast, in a merged FCS and ICV scheme, a receiver may be unable to distinguish between FCS failure and ICV failure. Either FCS failure or ICV failure will result in FCS_ICV failure. In this case, the receiver does not send an acknowledgement and will filter (e.g., discard) the packet. Thus, in some aspects, the outcome at higher protocol layers may be the same in either the conventional scheme or the merged schemed.

In the merged scheme, however, the receiver may perform ICV processing (e.g., based on FCS_ICV) before acknowledging a frame. For example, an acknowledgement is typically sent within a specified period of time (e.g., within a short interframe space (SIFS) time period). In 802.11ah, the SIFS is 160 microseconds. Thus, steps may be taken to ensure that the ICV processing step does not cause a delay that prevents transmission of the acknowledgement within the SIFS time period. Alternatively, steps may be taken to account for such a delay (e.g., due to the receiver having slower processing capability).

Various mechanisms may be employed to support the use of merged FCS and ICV. In some implementations, FCS_ICV capability is negotiated during association. The use of FCS_ICV also could be indicated in the frame header or some reserved field of the IV.

Also, before the frame format which includes FCS_ICV is used, the link could be tested using a standard security packet format to insure that the temporal keys are properly loaded on both sides. Such a format could also used in any debug modes employed.

In the merged FCS and ICV describe above in conjunction with FIGS. 3-5, it is possible that a hacker, after transmitting a frame and receiving the response acknowledgement which is based on successful verification of FCS_ICV, will know with 100% certainty that he or she has cracked the corresponding security key (TK).

To address this issue, an alternative scheme for merging FCS and ICV may use two fields instead of one field for the merged value. For example, one field may be based on a first subset of the ICV, while the other field may be based on a combination of the FCS and a second subset of the ICV.

In this case, after transmitting a frame and receiving the response acknowledgement, a hacker will not be sure whether the frame was properly authenticated or not. In this example, there is only a $\frac{1}{2}^{32}$ chance that a response acknowledgement indicates proper authentication by the receiver.

Figure 6:
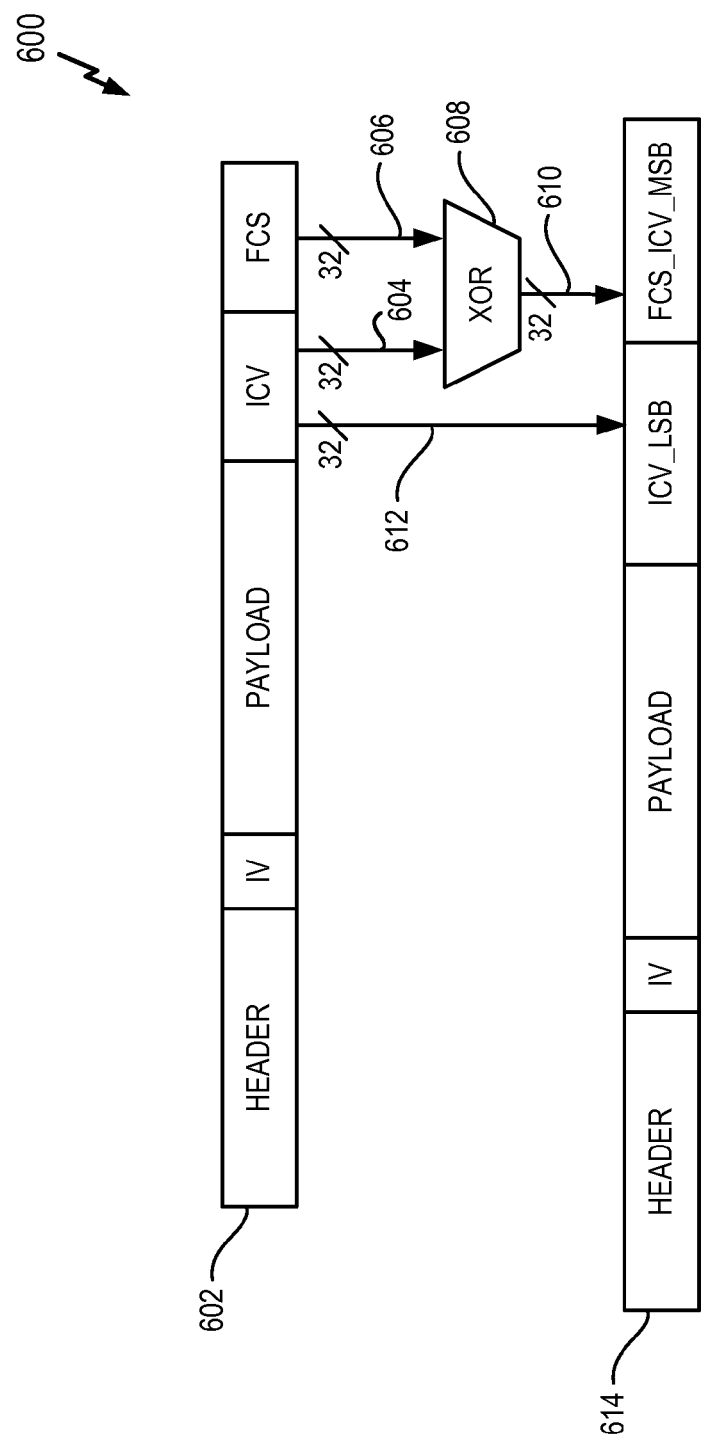
FIG. 6 illustrates another example of a technique where FCS and ICV are merged in accordance with some aspects of the disclosure.
Figure 7:
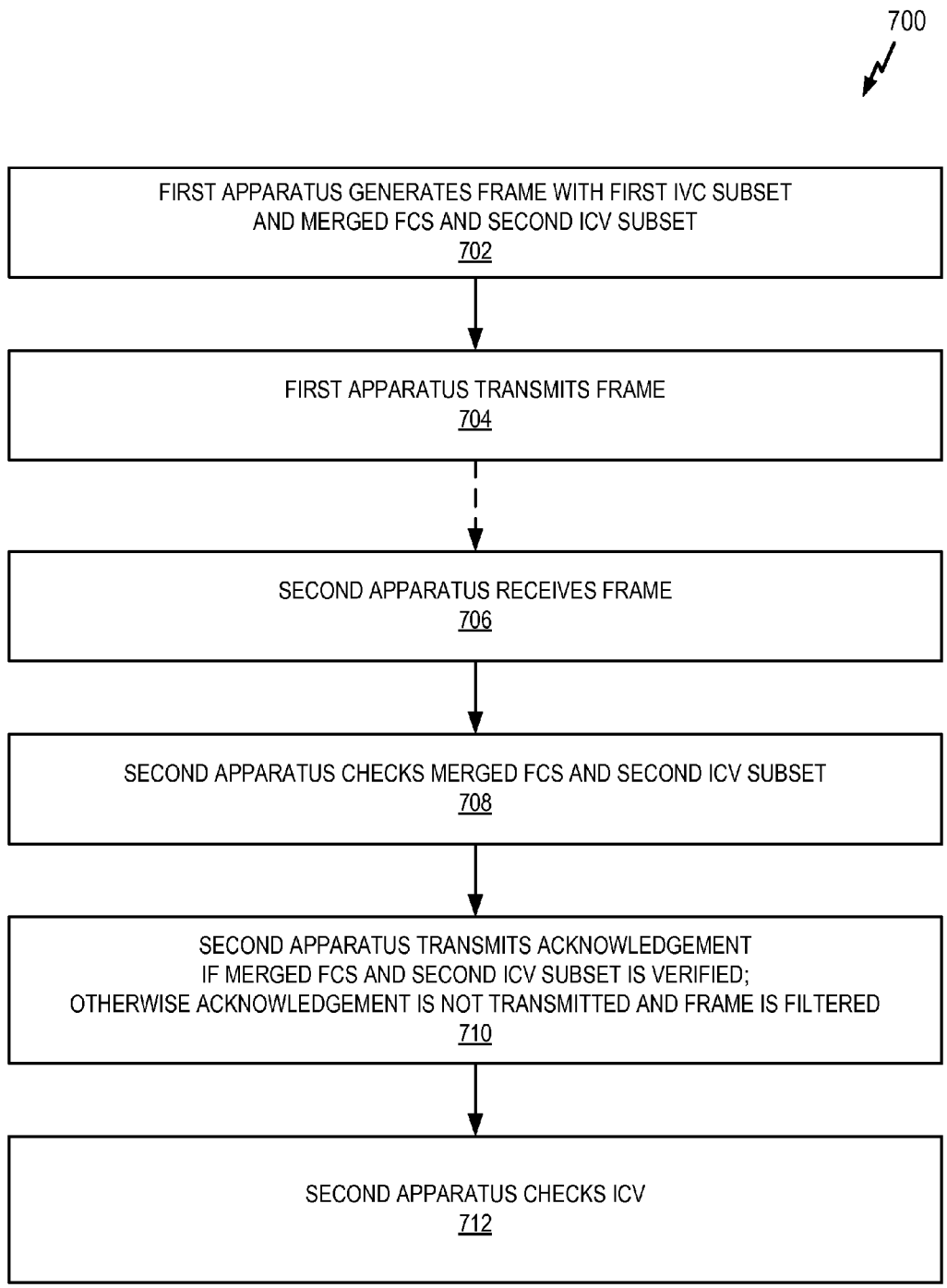
FIG. 7 is a flowchart of several sample aspects of additional operations relating to generating and processing a merged FCS and ICV in accordance with some aspects of the disclosure.
Figure 8:
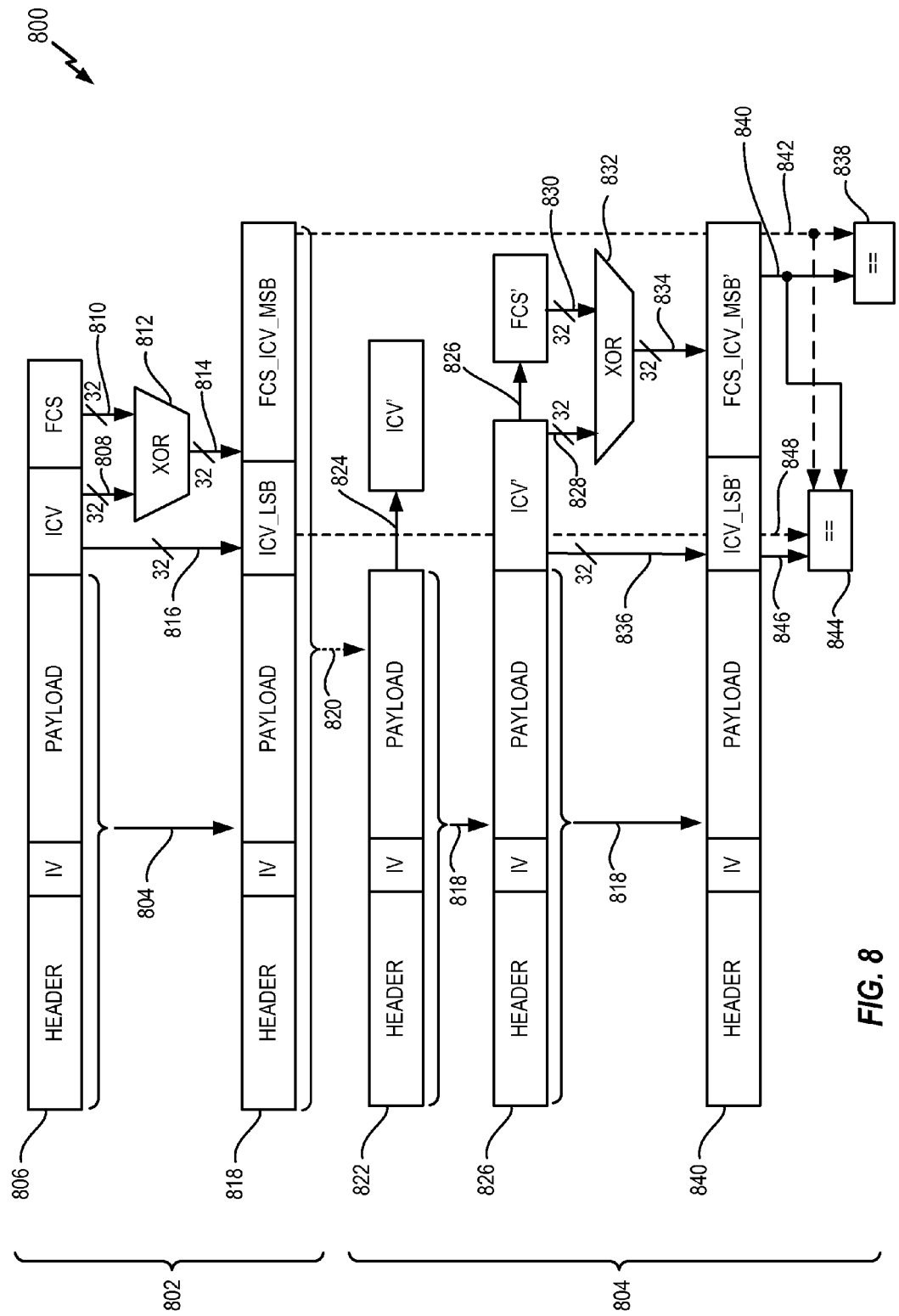
FIG. 8 illustrates another example of a verification technique in accordance with some aspects of the disclosure.

FIGS. 6-8 illustrate an example of such a merged FCS and ICV scheme. In this example, the first subset consists of the lower four bytes of the ICV (ICV_LSB=ICV [31:0]) and the second subset consists of the upper four bytes of the ICV merged with the FCS.

FIG. 6 illustrates a process 600 for merging FCS and ICV. FCS and ICV are initially calculated for a media access control (MAC) frame 602 that includes a MAC header, an IV, and a payload. The ICV can be calculated (e.g., using a cryptography algorithm) over the MAC header, the IV, and the payload. Typically, one or more fields of the MAC header are skipped for the ICV calculation to improve system efficiency. The FCS can be calculated (e.g., using a polynomial-based algorithm) over the MAC header, the IV, the payload, and the ICV.

As represented by a first line 604 and a second line 606, respectively, four bytes (32 bits) of the ICV and four bytes of the FCS are inputs to an exclusive-OR (XOR) 608. The output of the XOR 608, represented by a third line 610, consists of four bytes to provide a second subset of a new ICV for a frame 614.

The second subset is referred to as FCS_ICV_MSB and consists of four bytes. In this example, the four upper bytes of the ICV (ICV_MSB=ICV [63:32]) are XORed with all four bytes of the FCS. Thus, in this case, FCS_ICV_MSB=ICV [63:32]^FCS [31:0].

A first subset of the new ICV for the frame 614 consists of the four lower bytes of the ICV (ICV_LSB=ICV [31:0]), represented by a fourth line 612. Thus, the new ICV consists of eight bytes (ICV_LSB and FCS_ICV_MSB). Consequently, this technique provides the same number of bytes of ICV authentication protection as a conventional ICV technique.

FIG. 7 illustrates a process 700 where a first apparatus transmits a frame that includes a merged FCS and ICV to a second apparatus. Again, the first apparatus may be referred to as the transmitter and the second apparatus referred to as the receiver. The first and second apparatuses could be any combination of one or more access terminals (e.g., STAs), one or more access points (e.g., base stations), or one or more other type of communication node.

As represented by block 702, the first apparatus generates a frame that includes a merged FCS and ICV (ICV_LSB and FCS_ICV_MSB). For example, the operations of block 702 could correspond to the operations of the process 600 of FIG. 6.

As represented by block 704, the first apparatus transmits the frame generated at block 702 to a second apparatus. For example, the first apparatus could transmit the frame via an 802.11ah link.

As represented by block 706, the second apparatus receives the frame transmitted by the first apparatus at block 704.

As represented by block 708, the second apparatus checks the merged FCS and second subset of ICV (FCS_ICV_MSB) to determine whether the frame was successfully received (e.g., received without error or with correctable errors). An example of such a check is described below in conjunction with FIG. 8.

As represented by block 710, if the FCS_ICV_MSB is successfully verified at block 708, the second apparatus transmits an acknowledgement to the first apparatus. In this way, the first apparatus is informed that the frame was successfully received.

If the merged FCS and ICV was not successfully verified at block 708, the second apparatus does not transmit an acknowledgement. In addition, the second apparatus filters (e.g., discards) the frame, such that the frame (or its contents) is not sent to a higher protocol layer at the receiver.

As represented by block 712, the second apparatus also checks the overall ICV (ICV_LSB and FCS_ICV_MSB) to determine whether the frame was successfully received (e.g., received without error or with correctable errors). If this check passes, the receiver uses the received frame (e.g., passes the frame or its contents to a higher protocol layer). Otherwise, the receiver filters (e.g., discards) the frame, such that the frame (or its contents) is not sent to a higher protocol layer at the receiver. An example of the check of block 712 is described below in conjunction with FIG. 8.

FIG. 8 illustrates an example of a verification operation for the merged FCS and ICV scheme of FIG. 6. The first set of operations 802 of FIG. 8 correspond to the transmitter operations described in FIG. 6. The transmitter transmits the resulting packet via a wireless medium and this packet is subsequently received at a receiver. The second set of operations 804 of FIG. 8 correspond to operations at the receiver.

During the operations 802, FCS and ICV are initially calculated for a media access control (MAC) frame 806 that includes a MAC header, an IV, and an encrypted payload. The ICV is calculated based on the MAC header, the IV, and the payload. The FCS is calculated based the MAC header, the IV, the payload, and the ICV.

As represented by a first line 808 and a second line 810, respectively, the upper four bytes (32 bits) of the ICV and the four bytes of the FCS are inputs to an XOR 812. The output of the XOR 812, represented by a third line 814, consists of four bytes that constitute the FCS_ICV_MSB. The other four bytes of the ICV, represented by a fourth line 816, constitute the ICV_LSB. The transmitter then transmits a frame 818 including the header, the IV, the payload, and the new ICV (ICV_LSB and FCS_ICV_MSB) via a wireless medium, as represented by a first dashed line 820.

Upon receipt of a packet 822, the receiver generates a new ICV' based on the header, the IV, and the encrypted payload, as represented by a fifth line 824. The payload is decrypted to create clear text. The clear text is used to generate the unencrypted ICV. The ICV' is optionally encrypted if desired.

To reduce the complexity of FIG. 8, the ICV_LSB and FCS_ICV_MSB are not shown in the frame 822. It should be understood, however, that the frame 822 will include an ICV_LSB and FCS_ICV_MSB corresponding to the ICV_LSB and FCS_ICV_MSB of the transmitted frame 818.

The receiver generates a new FCS' based on the header, the IV, the encrypted payload, and the ICV', as represented by a sixth line 826. The receiver then generates ICV_LSB' and FCS_ICV_MSB' based on the ICV' and the FCS'.

Specifically, as represented by a seventh line 828 and an eight line 830, respectively, the upper four bytes (32 bits) of the ICV' and the four bytes of the FCS' are inputs to an XOR 832. The output of the XOR 832, represented by a ninth line 834, consists of four bytes that constitute FCS_ICV_MSB'. The lower four bytes of the ICV', represented by a tenth line 836, constitute ICV_LSB'.

A first comparator 838 at the receiver compares the FCS_ICV_MSB', represented by an eleventh line 840, with the FCS_ICV_MSB received in the frame 822, represented by a second dashed line 842. If these values are the same, this is the equivalent to an FCS pass. An acknowledgment or block acknowledgement (BA) decision may thus be based on this comparison.

A second comparator 844 at the receiver compares the generated merged ICV with the received merged ICV. Specifically, ICV_LSB', represented by a twelfth line 846 is compared with the received ICV_LSB, represented by a third dashed line 848. In addition, FCS_ICV_MSB', represented by the eleventh line 840, is compared with the received FCS_ICV_MSB, represented by the second dashed line 842. If both match, this is the equivalent to an ICV pass.

It should be appreciated that bit combinations other than those shown in FIGS. 3-8 may be employed in other implementations. For example, different groups of bits (e.g., odd bytes and even bytes) may be merged. As another example, if the FCS and the ICV have the same number of bits, all of the bits of the FCS and the ICV may be used to generate an FCS_ICV value.

Also, different functions (e.g., algorithms) may be employed to generate an FCS_ICV value or other similar merged value. Examples of other merging techniques include, without limitation, a hashing algorithm, an addition algorithm, a subtraction algorithm, a multiplication algorithm, or some other type of function.

Different types of encryption schemes also may be employed in accordance with the teachings herein. Also, the ICV could be either encrypted or not encrypted, as long as the same process is used to generate ICV and ICV'.

Various options may be employed in conjunction with a merged FCS and ICV scheme as taught herein. For example, a merged FCS and ICV scheme may be used for transmitting encrypted unicast data packets. Such a scheme may be employed, for example, for MAC overhead reduction. A merged FCS and ICV scheme also may be used for transmitting encrypted multicast data packets. Such a scheme may be employed, for example, in cases where all devices support the merged FCS and ICV scheme. A merged FCS and ICV scheme also may be used for transmitting management frames.

Figure 9:
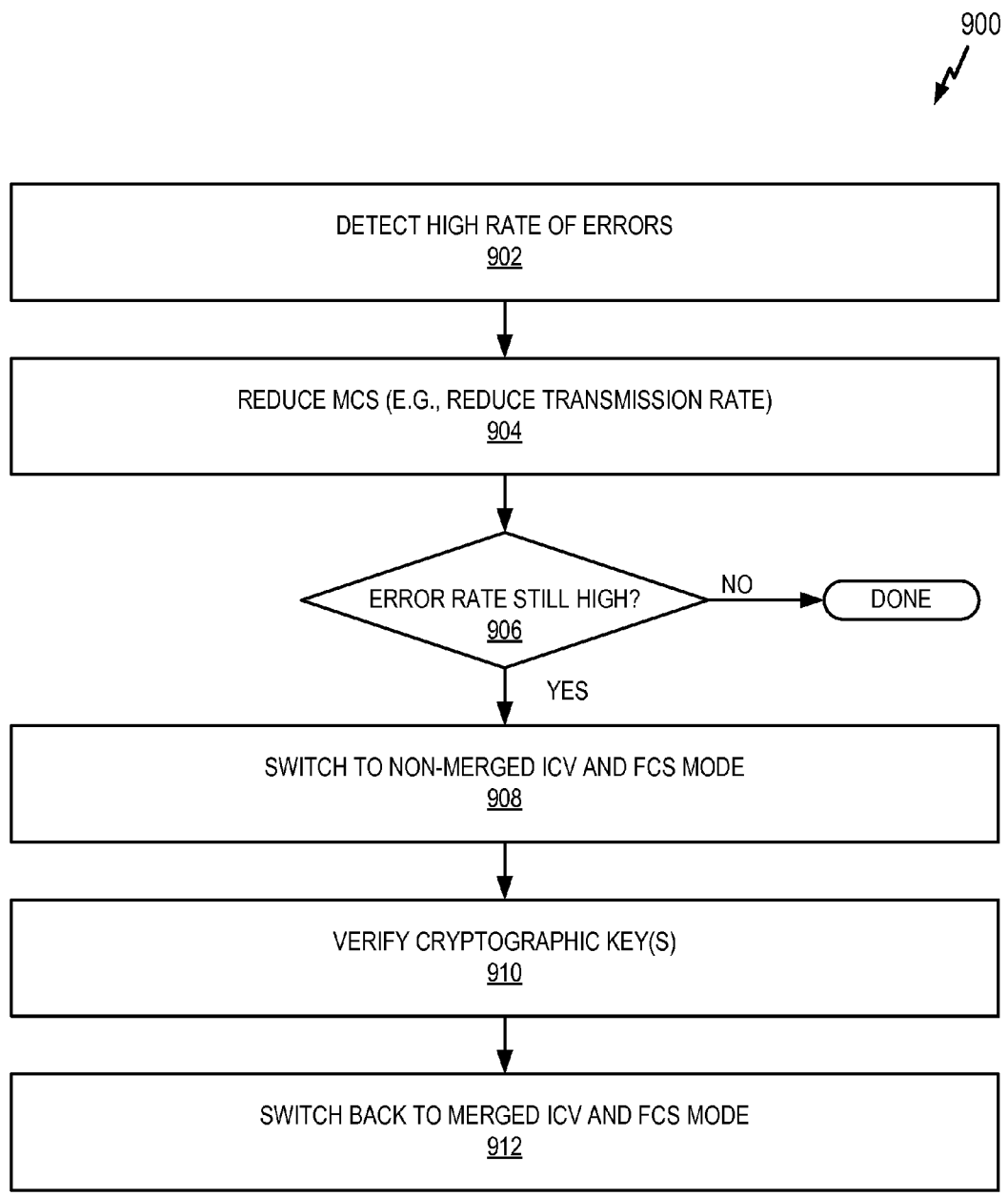
FIG. 9 is a flowchart of several sample aspects of operations relating to rate adaptation in accordance with some aspects of the disclosure.

Rate adaptation (e.g., modulation and coding scheme (MCS) adaptation) may assume an FCS error when an FCS_ICV error occurs. If error persists even at the lowest rates, the rate adaption may then try to use the standard security format to determine whether there is a key mismatch issue. FIG. 9 illustrates an example of a process 900 for such a scheme.

As represented by block 902, at some point in time, a relatively high error rate is detected. For example, a receiver may determine that the number of block errors received over a period of time exceeds a threshold.

As represented by block 904, a lower MCS may be selected in attempt to reduce the receive error rate. For example, if the errors are caused by channel conditions, a reduction in the transmission rate should result in fewer receive errors.

As represented by block 906, a determination is made as to whether the error rate is still high. If not, the process may terminate (e.g., until a high error rate is again detected). On the other hand, if the error rate is still high at block 906, operations to verify the encryption keys being used for the communication may be invoked.

As represented by block 908, the receiver switches to a non-merged ICV and FCS mode. In this way, ICV/FCS errors corresponding to the merging scheme may be eliminated as a cause of the receive error.

As represented by block 910, one or more cryptographic keys are verified. If called for, a new set of key may be negotiated between the transmitter and receiver.

As represented by block 912, the receiver switches back to the merged ICV and FCS mode. In this case, subsequently detected ICV/FCS errors may be reliably considered to be due to an issue other than a problem with the security keys.

With the above in mind, additional examples of operations relating to reduced communication overhead that may be performed in accordance with the teachings herein will be described with reference to FIGS. 10-13.

Figure 10:
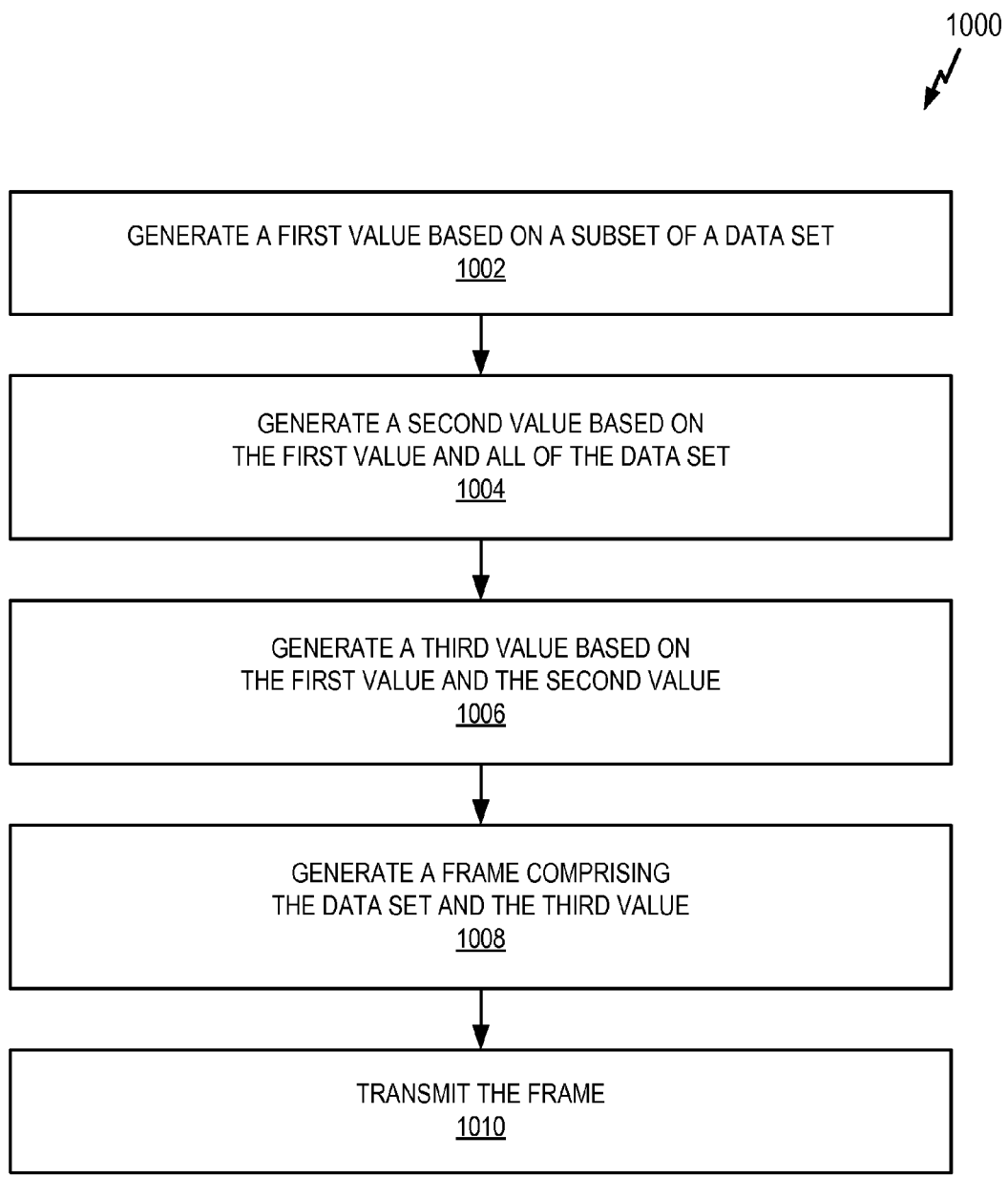
FIG. 10 is a flowchart of several sample aspects of operations relating to transmitting a frame that includes a merged verification value in accordance with some aspects of the disclosure.

Referring initially to FIG. 10, in some aspects, this flowchart describes sample operations that may be performed by an apparatus in conjunction with transmitting a frame. In some implementations, the apparatus may embody (e.g., include, be implemented as, or be implemented within) an access point, an access terminal, or some other suitable type of node.

As represented by block 1002, a first value is generated based on a subset of a data set. In some aspects, the first value may comprise an ICV. In some aspects, the generation of the first value may comprise executing a first type of verification algorithm that uses the subset of the data set.

In some aspects, the data set comprises information for a packet. For example, the data set may comprise at least one of: a data payload, an initialization vector (IV), or a media access control (MAC) header. In this case, the subset of the data set may comprise at least one of: the data payload, the initialization vector (IV), or a subset of the media access control (MAC) header.

As represented by block 1004, a second value is generated based on the first value and all of the data set. In some aspects, the second value may comprise a frame check sequence (FCS). In some aspects, the generation of the second value may comprise executing a second type of verification algorithm that uses the first value and all of the data set.

As represented by block 1006, a third value is generated based on the first value and the second value. In some aspects, the generation of the third value may comprise: using a combination of a first subset of the first value (e.g., MSB of ICV) and all of the second value (e.g., FCS) as a first subset of the third value (e.g., MSB of FCS_ICV); and using a second subset of the first value (e.g., LSB of ICV) as a second subset of the third value (e.g., LSB of FCS_ICV). In some aspects, the generation of the third value may comprise performing a hashing operation based on the first value and the second value. In some aspects, the generation of the third value may comprise exclusive-ORing (XORing) a subset of the first value with all of the second value.

As represented by block 1008, a frame comprising the data set and the third value is generated. For example, the resulting frame may comprise a MAC header, an IV, a payload, and an FCS_ICV value. In some aspects, the generation of the frame may comprise including the third value but not the first and second values in the frame. In some aspects, the generation of the frame may comprise including, in the frame, an indication that the frame comprises the third value.

As represented by block 1010, the frame generated at block 1008 is transmitted.

Figure 11:
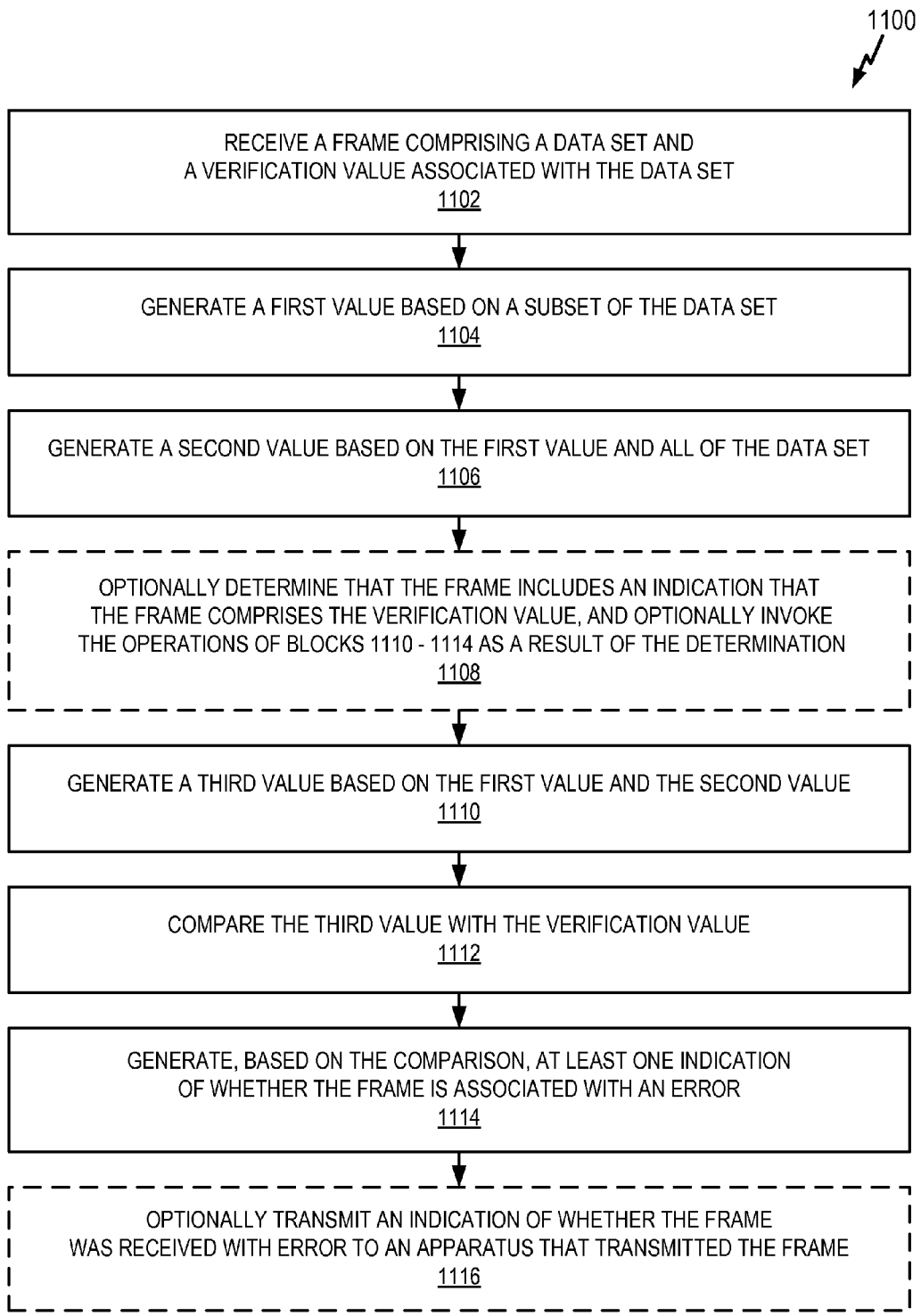
FIG. 11 is a flowchart of several sample aspects of operations relating to receiving a frame that includes a merged verification value in accordance with some aspects of the disclosure.

Referring to FIG. 11, in some aspects, this flowchart describes sample operations that may be performed by an apparatus in conjunction with receiving a frame (e.g., the frame transmitted at block 1010 of FIG. 10). In some implementations, the apparatus may embody (e.g., include, be implemented as, or be implemented within) an access point, an access terminal, or some other suitable type of node.

As represented by block 1102, a frame is received. This frame may comprise a data set and a verification value associated with the data set. For example, the resulting frame may comprise a MAC header, an IV, a payload, and an FCS_ICV value.

As represented by block 1104, a first value is generated based on a subset of a data set. In some aspects, the first value may comprise an ICV. In some aspects, the generation of the first value may comprise executing a first type of verification algorithm that uses the subset of the data set.

In some aspects, the data set comprises information for a packet. For example, the data set may comprise: a data payload, an initialization vector (IV), and a media access control (MAC) header. In this case, the subset of the data set may comprise: the data payload, the initialization vector (IV), and a subset of the media access control (MAC) header.

As represented by block 1106, a second value is generated based on the first value and all of the data set. In some aspects, the second value may comprise a frame check sequence (FCS). In some aspects, the generation of the second value may comprise executing a second type of verification algorithm that uses the first value and all of the data set.

As represented by optional block 1108, in some implementations, a determination may be made as to whether the frame includes an indication that the frame comprises the verification value (e.g., an indication that the frame includes an FCS_ICV value). In this case, invocation of the operations of blocks 1110-1114 (generation of a third value, comparison of the third value with the verification value, and generation of at least one indication) may be invoked as a result of this determination.

As represented by block 1110, a third value is generated based on the first value and the second value. In some aspects, the generation of the third value may comprise: using a combination of a first subset of the first value (e.g., MSB of ICV) and all of the second value (e.g., FCS) as a first subset of the third value (e.g., MSB of FCS_ICV); and using a second subset of the first value (e.g., LSB of ICV) as a second subset of the third value (e.g., LSB of FCS_ICV). In some aspects, the generation of the third value may comprise performing a hashing operation based on the first value and the second value. In some aspects, the generation of the third value may comprise exclusive-ORing (XORing) a subset of the first value with all of the second value.

As represented by block 1112, the third value is compared with the verification value. In some aspects, the comparison of the third value with the verification value may comprise comparing a first subset of the third value (e.g., FCS_ICV_MSB') with a first subset of the verification value (e.g., FCS_ICV_MSB). In some aspects, the comparison of the third value with the verification value may further comprise comparing a second subset of the third value (e.g., ICV_LSB') with a second subset of the verification value (e.g., ICV_LSB).

As represented by block 1114, based on the comparison of block 1112, at least one indication of whether the frame is associated with an error is generated. In cases where the comparison of the third value with the verification value comprises comparing a first subset of the third value (e.g., FCS_ICV_MSB') with a first subset of the verification value (e.g., FCS_ICV_MSB), the generation of the at least one indication may comprise generating, based on the comparison of the first subset of the third value with the first subset of the verification value, an indication of whether the frame was received with error (e.g., FCS pass/fail). In cases where the comparison of the third value with the verification value further comprises comparing a second subset of the third value (e.g., ICV_LSB') with a second subset of the verification value (e.g., ICV_LSB), the generation of the at least one indication may comprise generating, based on the comparison of the second subset of the third value with the second subset of the verification value and further based on the indication of whether the frame was received with error, an indication of whether the subset of the data set was received with error (e.g., ICV pass/fail).

As represented by optional block 1116, in some cases, an indication of whether the frame was received with error is transmitted to an apparatus that transmitted the frame.

Figure 12:
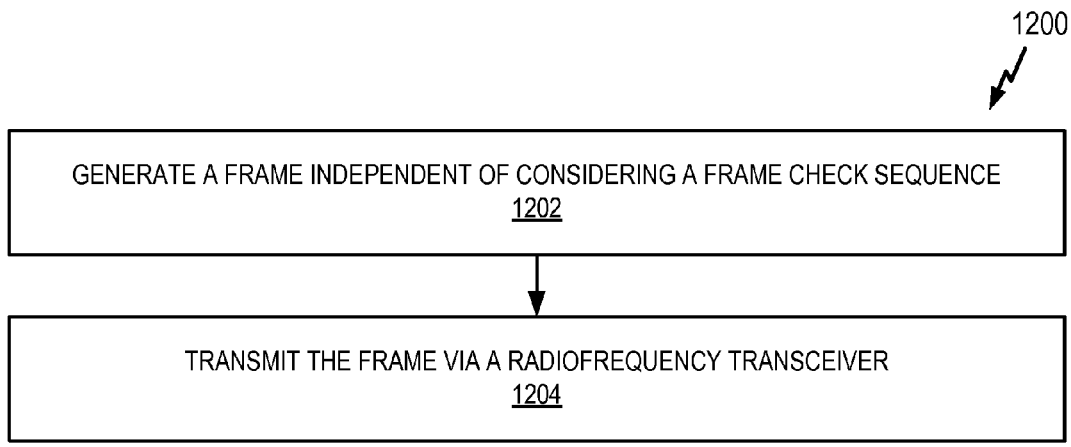
FIG. 12 is a flowchart of several sample aspects of operations relating to transmitting a frame irrespective of FCS in accordance with some aspects of the disclosure.
Figure 13:
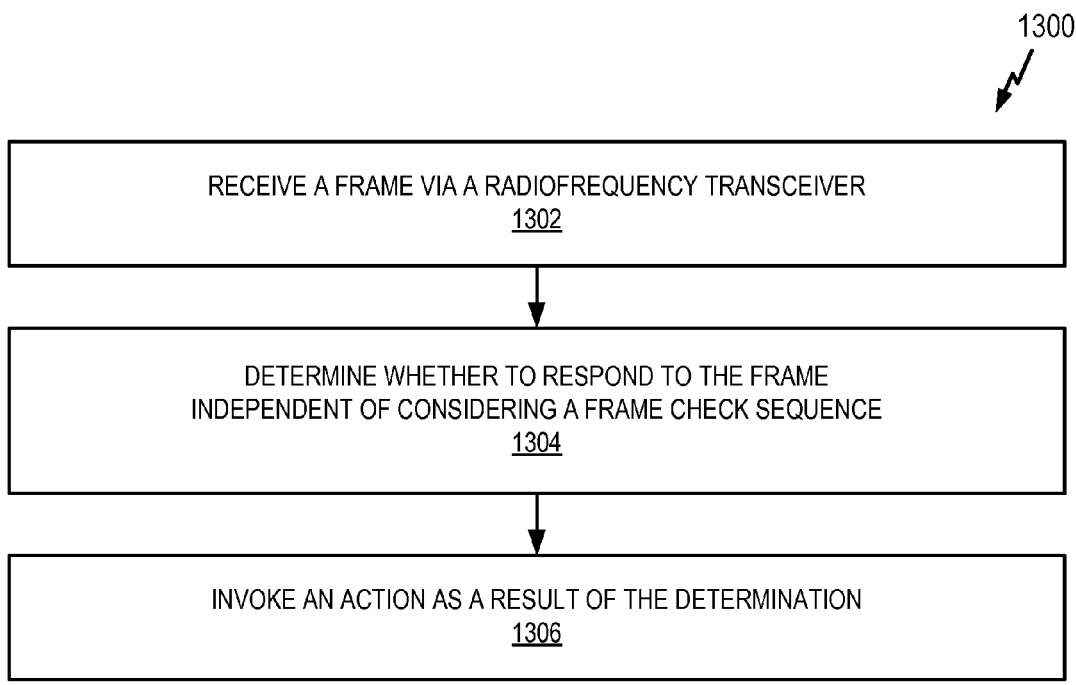
FIG. 13 is a flowchart of several sample aspects of operations relating to receiving a frame irrespective of FCS in accordance with some aspects of the disclosure.

FIGS. 12 and 13 describe operations relating to the use of a frame that does not include an FCS. For example, such a frame might include an ICV that provides a sufficient degree of verification for the frame.

FIG. 12 describes sample operations that may be performed by an apparatus in conjunction with transmitting a frame. In some implementations, the apparatus may embody (e.g., include, be implemented as, or be implemented within) an access point, an access terminal, or some other suitable type of node.

As represented by block 1202, a frame is generated independent of considering a frame check sequence. For example, a frame check sequence might not be generated for the frame and/or included in the frame. In some aspects, the frame may comprise an IEEE 802.11ah frame. In some aspects, the generation of the frame may comprise generating a verification value (e.g., ICV) based on a data set; and including the data set and the verification value in the frame. In some aspects, the generation of the frame may comprise including at least one of: a media access control (MAC) header, a data payload, an initialization vector (IV), or an integrity check value (ICV), in the frame.

As represented by block 1204, the frame is transmitted via a radiofrequency transceiver. For example, the frame transmitted at block 1204 may be received and used as discussed in FIG. 13.

FIG. 13 describes sample operations that may be performed by an apparatus in conjunction with receiving a frame. In some implementations, the apparatus may embody (e.g., include, be implemented as, or be implemented within) an access point, an access terminal, or some other suitable type of node.

As represented by block 1302, a frame is received via a radiofrequency (RF) transceiver. In some aspects, the frame may comprise an IEEE 802.11ah frame. In some aspects, the frame may comprise a verification value other than an FCS (e.g., an ICV). In some aspects, the frame may comprise at least one of: a media access control (MAC) header, a data payload, an initialization vector (IV), or an integrity check value (ICV).

As represented by block 1304, a determination is made regarding whether to respond to the frame independent of considering a frame check sequence. For example, a decision regarding whether to acknowledge the frame or whether to pass the frame to a higher protocol layer may be made without performing any frame check sequence operations.

As represented by block 1306, an action is invoked as a result of the determination of block 1304. For example, if the determination is to respond to the frame, the action may comprise transmitting an indication that the frame was successfully received. As another example, if the determination is to not respond to the frame, the action may comprise dropping the frame without transmitting an indication that the frame was not successfully received.

In practice, some fields in a packet (e.g., FC: retry, FC: power management, and duration, etc.) might not impact ICV. Accordingly, failure on these bits might not be detected if FCS is omitted from the packet. Accordingly, provisions can be made in some cases to account for an inability to detect failure on these bits, to take other action to detect a failure on these bits, or to correct an error on these bits.

The teachings herein may be implemented using various wireless technologies. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 14:
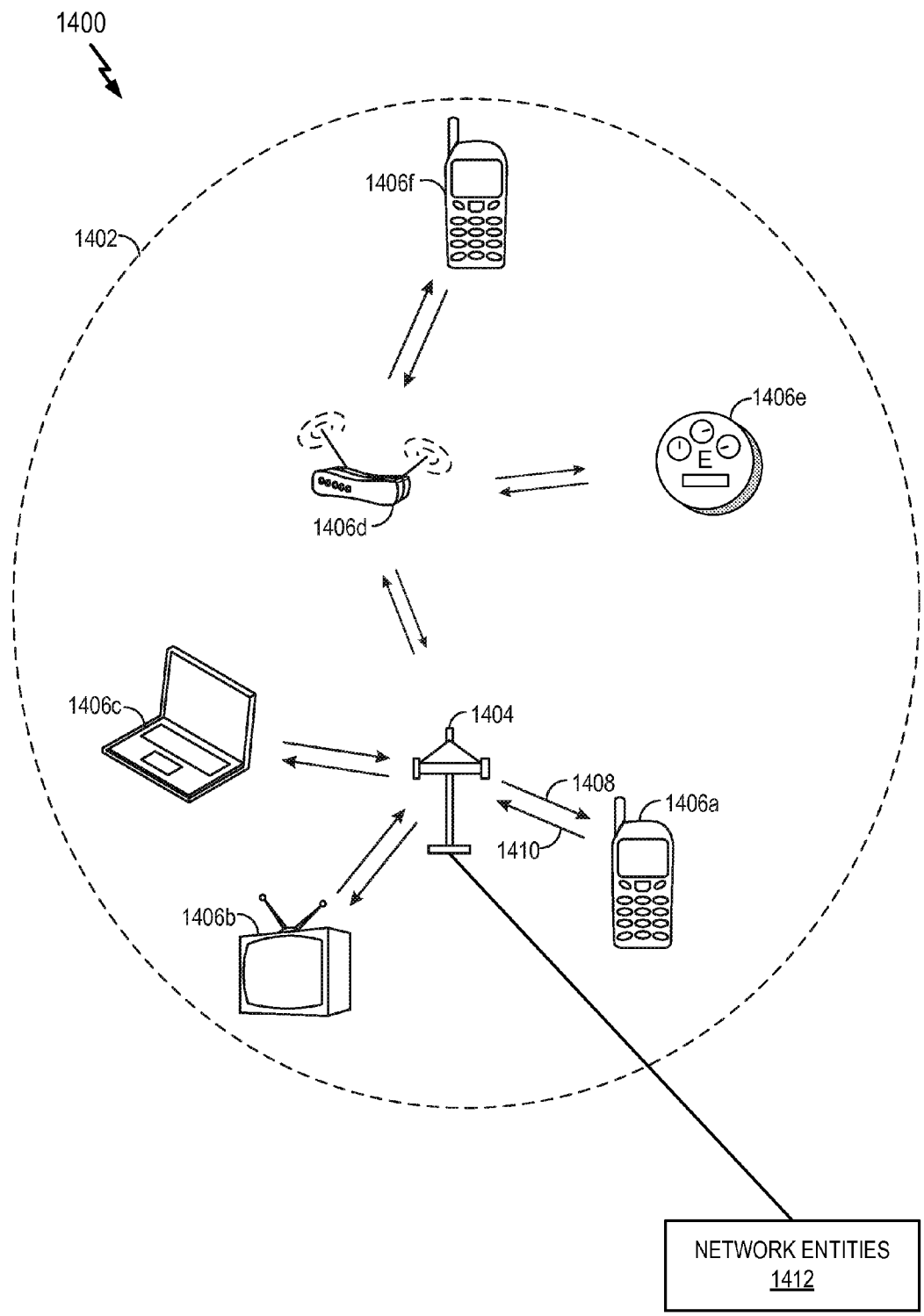
FIG. 14 illustrates an example of a wireless communication system in which aspects of the present disclosure may be employed.

FIG. 14 illustrates an example of a wireless communication system 1400 in which aspects of the present disclosure may be employed. The wireless communication system 1400 may operate pursuant to a wireless standard, for example the 802.11 standard. The wireless communication system 1400 may include an AP 1404, which communicates with STAs 1406a, 1406b, 1406c, 1406d, 1406e, and 1406f (collectively STAs 1406).

STAs 1406e and 1406f may have difficulty communicating with the AP 1404 or may be out of range and unable to communicate with the AP 1404. As such, another STA 1406d may be configured as a relay device (e.g., a device comprising STA and AP functionality) that relays communication between the AP 1404 and the STAs 1406e and 1406f.

A variety of processes and methods may be used for transmissions in the wireless communication system 1400 between the AP 1404 and the STAs 1406. For example, signals may be sent and received between the AP 1404 and the STAs 1406 in accordance with OFDM/OFDMA techniques. If this is the case, the wireless communication system 1400 may be referred to as an OFDM/OFDMA system. Alternatively, signals may be sent and received between the AP 1404 and the STAs 1406 in accordance with CDMA techniques. If this is the case, the wireless communication system 1400 may be referred to as a CDMA system.

A communication link that facilitates transmission from the AP 1404 to one or more of the STAs 1406 may be referred to as a downlink (DL) 1408, and a communication link that facilitates transmission from one or more of the STAs 1406 to the AP 1404 may be referred to as an uplink (UL) 1410. Alternatively, a downlink 1408 may be referred to as a forward link or a forward channel, and an uplink 1410 may be referred to as a reverse link or a reverse channel.

The AP 1404 may act as a base station and provide wireless communication coverage in a basic service area (BSA) 1402. The AP 1404 along with the STAs 1406 associated with the AP 1404 and that use the AP 1404 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 1404 or to some other access point in the network (not shown).

Each of the access points may communicate with one or more network entities (represented, for convenience, by network entities 1412 in FIG. 14), including each other, to facilitate wide area network connectivity. A network entity may take various forms such as, for example, one or more radio and/or core network entities. Thus, in various implementations the network entities 1412 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 1400 might not have a central AP 1404, but rather may function as a peer-to-peer network between the STAs 1406. Accordingly, the functions of the AP 1404 described herein may alternatively be performed by one or more of the STAs 1406. Also, as mentioned above, a relay may incorporate at least some of the functionality of an AP and a STA.

Figure 15:
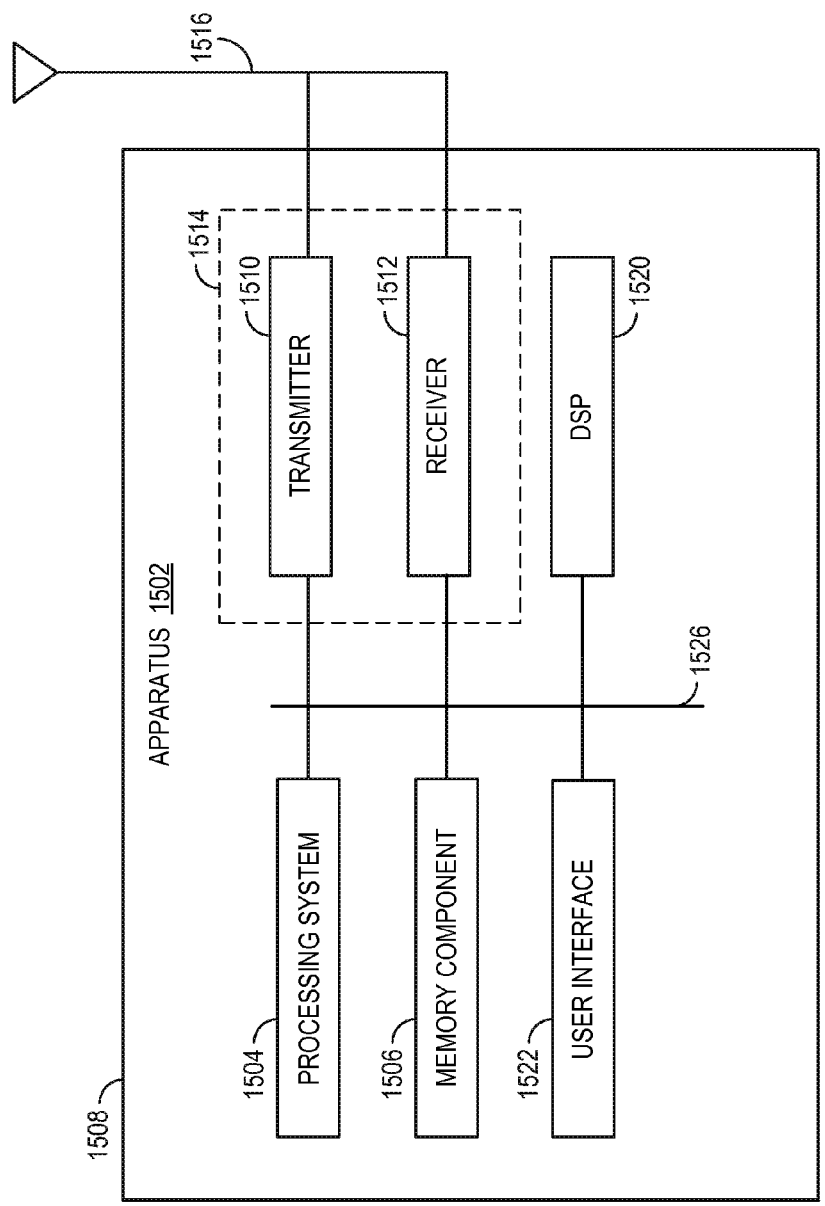
FIG. 15 shows a functional block diagram of an exemplary apparatus that may be employed within a wireless communication system.

FIG. 15 illustrates various components that may be utilized in an apparatus 1502 (e.g., a wireless device) that may be employed within the wireless communication system 1400. The apparatus 1502 is an example of a device that may be configured to implement the various methods described herein. For example, the apparatus 1502 may comprise the AP 1404, a relay 1406*d*, or one of the STAs 1406 of FIG. 14.

The apparatus 1502 may include a processing system 1504 that controls operation of the apparatus 1502. The processing system 1504 may also be referred to as a central processing unit (CPU). A memory component 1506 (e.g., including a memory device), which may include both read-only memory (ROM) and random access memory (RAM), provides instructions and data to the processing system 1504. A portion of the memory component 1506 may also include non-volatile random access memory (NVRAM). The processing system 1504 typically performs logical and arithmetic operations based on program instructions stored within the memory component 1506. The instructions in the memory component 1506 may be executable to implement the methods described herein.

When the apparatus 1502 is implemented or used as a transmitting node, the processing system 1504 may be configured to select one of a plurality of media access control (MAC) header types, and to generate a packet having that MAC header type. For example, the processing system 1504 may be configured to generate a packet comprising a MAC header and a payload and to determine what type of MAC header to use.

When the apparatus 1502 is implemented or used as a receiving node, the processing system 1504 may be configured to process packets of a plurality of different MAC header types. For example, the processing system 1504 may be configured to determine the type of MAC header used in a packet and process the packet and/or fields of the MAC header.

The processing system 1504 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1502 may also include a housing 1508 that may include a transmitter 1510 and a receiver 1512 to allow transmission and reception of data between the apparatus 1502 and a remote location. The transmitter 1510 and receiver 1512 may be combined into single communication device (e.g., a transceiver 1514). An antenna 1516 may be attached to the housing 1508 and electrically coupled to the transceiver 1514. The apparatus 1502 may also include (not shown) multiple transmitters, multiple receivers, multiple transceivers, and/or multiple antennas. A transmitter 1510 and a receiver 1512 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 1510 may be configured to wirelessly transmit packets having different MAC header types. For example, the transmitter 1510 may be configured to transmit packets with different types of headers generated by the processing system 1504, discussed above.

The receiver 1512 may be configured to wirelessly receive packets having different MAC header type. In some aspects, the receiver 1512 is configured to detect a type of a MAC header used and process the packet accordingly.

The receiver 1512 may be used to detect and quantify the level of signals received by the transceiver 1514. The receiver 1512 may detect such signals as total energy, energy per subcarrier per symbol, power spectral density and other signals. The apparatus 1502 may also include a digital signal processor (DSP) 1520 for use in processing signals. The DSP 1520 may be configured to generate a data unit for transmission. In some aspects, the data unit may comprise a physical layer data unit (PPDU). In some aspects, the PPDU is referred to as a packet.

The apparatus 1502 may further comprise a user interface 1522 in some aspects. The user interface 1522 may comprise a keypad, a microphone, a speaker, and/or a display. The user interface 1522 may include any element or component that conveys information to a user of the apparatus 1502 and/or receives input from the user.

The various components of the apparatus 1502 may be coupled together by a bus system 1526. The bus system 1526 may include a data bus, for example, as well as a power bus, a control signal bus, and a status signal bus in addition to the data bus. Those of skill in the art will appreciate the components of the apparatus 1502 may be coupled together or accept or provide inputs to each other using some other mechanism.

Although a number of separate components are illustrated in FIG. 15, one or more of the components may be combined or commonly implemented. For example, the processing system 1504 may be used to implement not only the functionality described above with respect to the processing system 1504, but also to implement the functionality described above with respect to the transceiver 1514 and/or the DSP 1520. Further, each of the components illustrated in FIG. 15 may be implemented using a plurality of separate elements. Furthermore, the processing system 1504 may be used to implement any of the components, modules, circuits, or the like described below, or each may be implemented using a plurality of separate elements.

For ease of reference, when the apparatus 1502 is configured as a transmitting node, it is hereinafter referred to as an apparatus 1502*t*. Similarly, when the apparatus 1502 is configured as a receiving node, it is hereinafter referred to as an apparatus 1502*r*. A device in the wireless communication system 1400 may implement only functionality of a transmitting node, only functionality of a receiving node, or functionality of both a transmitting node and a receive node.

As discussed above, the apparatus 1502 may comprise an AP 1404 or a STA 1406, and may be used to transmit and/or receive communication having a plurality of MAC header types.

The components of FIG. 15 may be implemented in various ways. In some implementations, the components of FIG. 15 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 15 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 16:
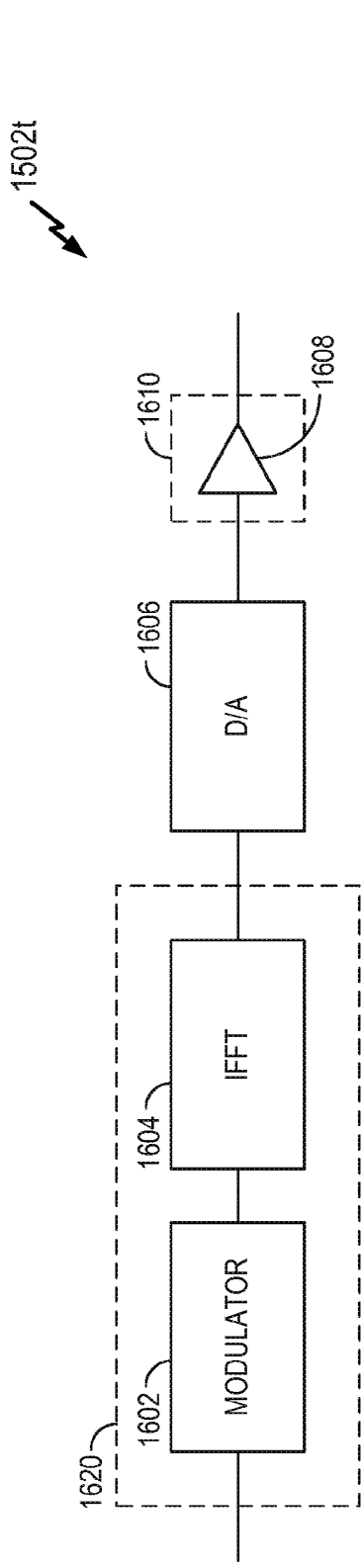
FIG. 16 shows a functional block diagram of exemplary components that may be utilized in the apparatus of FIG. 15 to transmit wireless communication.

As discussed above, the apparatus 1502 may comprise an AP 1404 or a STA 1406, a relay, or some other type of apparatus, and may be used to transmit and/or receive communication. FIG. 16 illustrates various components that may be utilized in the apparatus 1502*t* to transmit wireless communication. The components illustrated in FIG. 16 may be used, for example, to transmit OFDM communication. In some aspects, the components illustrated in FIG. 16 are used to generate and transmit packets to be sent over a bandwidth of less than or equal to 1 MHz.

The apparatus 1502*t* of FIG. 16 may comprise a modulator 1602 configured to modulate bits for transmission. For example, the modulator 1602 may determine a plurality of symbols from bits received from the processing system 1504 (FIG. 15) or the user interface 1522 (FIG. 15), for example by mapping bits to a plurality of symbols according to a constellation. The bits may correspond to user data or to control information. In some aspects, the bits are received in codewords. In one aspect, the modulator 1602 comprises a QAM (quadrature amplitude modulation) modulator, for example a 16-QAM modulator or a 64-QAM modulator. In other aspects, the modulator 1602 comprises a binary phase-shift keying (BPSK) modulator or a quadrature phase-shift keying (QPSK) modulator.

The apparatus 1502*t* may further comprise a transform module 1604 configured to convert symbols or otherwise modulated bits from the modulator 1602 into a time domain. In FIG. 16, the transform module 1604 is illustrated as being implemented by an inverse fast Fourier transform (IFFT) module. In some implementations, there may be multiple transform modules (not shown) that transform units of data of different sizes. In some implementations, the transform module 1604 may be itself configured to transform units of data of different sizes. For example, the transform module 1604 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1604 may be referred to as the size of the transform module 1604.

In FIG. 16, the modulator 1602 and the transform module 1604 are illustrated as being implemented in the DSP 1620. In some aspects, however, one or both of the modulator 1602 and the transform module 1604 are implemented in the processing system 1504 or in another element of the apparatus 1502*t* (e.g., see description above with reference to FIG. 15).

As discussed above, the DSP 1620 may be configured to generate a data unit for transmission. In some aspects, the modulator 1602 and the transform module 1604 may be configured to generate a data unit comprising a plurality of fields including control information and a plurality of data symbols.

Returning to the description of FIG. 16, the apparatus 1502*t* may further comprise a digital to analog converter 1606 configured to convert the output of the transform module into an analog signal. For example, the time-domain output of the transform module 1606 may be converted to a baseband OFDM signal by the digital to analog converter 1606. The digital to analog converter 1606 may be implemented in the processing system 1504 or in another element of the apparatus 1502 of FIG. 15. In some aspects, the digital to analog converter 1606 is implemented in the transceiver 1514 (FIG. 15) or in a data transmit processor.

The analog signal may be wirelessly transmitted by the transmitter 1610. The analog signal may be further processed before being transmitted by the transmitter 1610, for example by being filtered or by being upconverted to an intermediate or carrier frequency. In the aspect illustrated in FIG. 16, the transmitter 1610 includes a transmit amplifier 1608. Prior to being transmitted, the analog signal may be amplified by the transmit amplifier 1608. In some aspects, the amplifier 1608 comprises a low noise amplifier (LNA).

The transmitter 1610 is configured to transmit one or more packets or data units in a wireless signal based on the analog signal. The data units may be generated using the processing system 1504 (FIG. 15) and/or the DSP 1620, for example using the modulator 1602 and the transform module 1604 as discussed above. Data units that may be generated and transmitted as discussed above are described in additional detail below.

Figure 17:
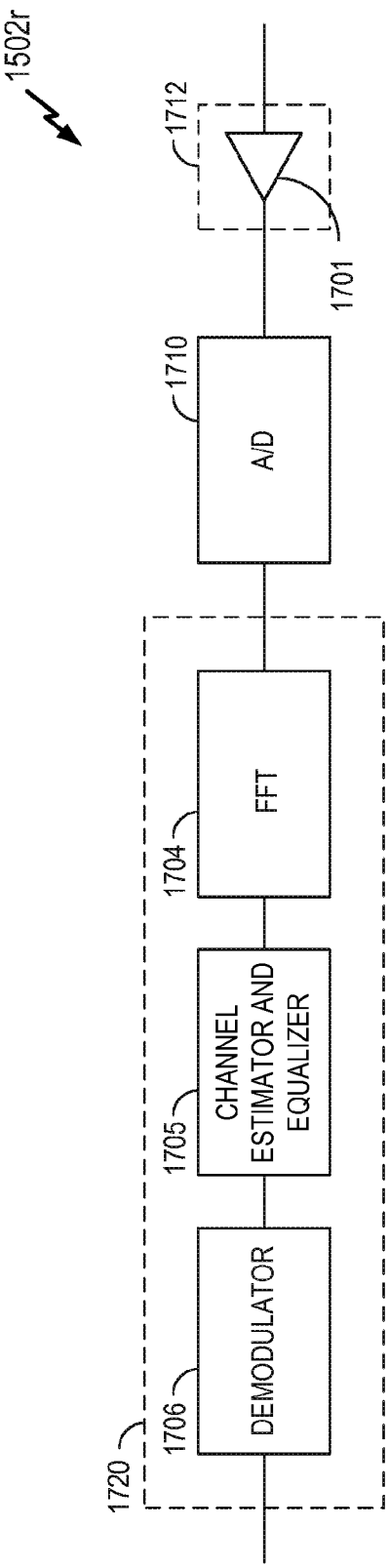
FIG. 17 shows a functional block diagram of exemplary components that may be utilized in the apparatus of FIG. 15 to receive wireless communication.

FIG. 17 illustrates various components that may be utilized in the apparatus 1502 of FIG. 15 to receive wireless communication. The components illustrated in FIG. 17 may be used, for example, to receive OFDM communication. For example, the components illustrated in FIG. 17 may be used to receive data units transmitted by the components discussed above with respect to FIG. 16.

The receiver 1712 of apparatus 1502*r* is configured to receive one or more packets or data units in a wireless signal. Data units that may be received and decoded or otherwise processed as discussed below.

In the aspect illustrated in FIG. 17, the receiver 1712 includes a receive amplifier 1701. The receive amplifier 1701 may be configured to amplify the wireless signal received by the receiver 1712. In some aspects, the receiver 1712 is configured to adjust the gain of the receive amplifier 1701 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1701 comprises an LNA.

The apparatus 1502*r* may comprise an analog to digital converter 1710 configured to convert the amplified wireless signal from the receiver 1712 into a digital representation thereof. Further to being amplified, the wireless signal may be processed before being converted by the digital to analog converter 1710, for example by being filtered or by being downconverted to an intermediate or baseband frequency. The analog to digital converter 1710 may be implemented in the processing system 1504 (FIG. 15) or in another element of the apparatus 1502*r*. In some aspects, the analog to digital converter 1710 is implemented in the transceiver 1514 (FIG. 15) or in a data receive processor.

The apparatus 1502*r* may further comprise a transform module 1704 configured to convert the representation of the wireless signal into a frequency spectrum. In FIG. 17, the transform module 1704 is illustrated as being implemented by a fast Fourier transform (FFT) module. In some aspects, the transform module may identify a symbol for each point that it uses. As described above with reference to FIG. 16, the transform module 1704 may be configured with a plurality of modes, and may use a different number of points to convert the signal in each mode. The number of points used by the transform module 1704 may be referred to as the size of the transform module 1704. In some aspects, the transform module 1704 may identify a symbol for each point that it uses.

The apparatus 1502r may further comprise a channel estimator and equalizer 1705 configured to form an estimate of the channel over which the data unit is received, and to remove certain effects of the channel based on the channel estimate. For example, the channel estimator 1705 may be configured to approximate a function of the channel, and the channel equalizer may be configured to apply an inverse of that function to the data in the frequency spectrum.

The apparatus 1502r may further comprise a demodulator 1706 configured to demodulate the equalized data. For example, the demodulator 1706 may determine a plurality of bits from symbols output by the transform module 1704 and the channel estimator and equalizer 1705, for example by reversing a mapping of bits to a symbol in a constellation. The bits may be processed or evaluated by the processing system 1504 (FIG. 15), or used to display or otherwise output information to the user interface 1522 (FIG. 15). In this way, data and/or information may be decoded. In some aspects, the bits correspond to codewords. In one aspect, the demodulator 1706 comprises a QAM (quadrature amplitude modulation) demodulator, for example a 16-QAM demodulator or a 64-QAM demodulator. In other aspects, the demodulator 1706 comprises a binary phase-shift keying (BPSK) demodulator or a quadrature phase-shift keying (QPSK) demodulator.

In FIG. 17, the transform module 1704, the channel estimator and equalizer 1705, and the demodulator 1706 are illustrated as being implemented in the DSP 1720. In some aspects, however, one or more of the transform module 1704, the channel estimator and equalizer 1705, and the demodulator 1706 are implemented in the processing system 1504 (FIG. 15) or in another element of the apparatus 1502 (FIG. 15).

As discussed above, the wireless signal received at the receiver 1512 comprises one or more data units. Using the functions or components described above, the data units or data symbols therein may be decoded evaluated or otherwise evaluated or processed. For example, the processing system 1504 (FIG. 15) and/or the DSP 1720 may be used to decode data symbols in the data units using the transform module 1704, the channel estimator and equalizer 1705, and the demodulator 1706.

Data units exchanged by the AP 1404 and the STA 1406 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1502t shown in FIG. 16 is an example of a single transmit chain used for transmitting via an antenna. The apparatus 1502r shown in FIG. 17 is an example of a single receive chain used for receiving via an antenna. In some implementations, the apparatus 1502t or 1502r may implement a portion of a MIMO system using multiple antennas to simultaneously transmit data.

The wireless network 1400 may employ methods to allow efficient access of the wireless medium based on unpredictable data transmissions while avoiding collisions. As such, in accordance with various aspects, the wireless network 1400 performs carrier sense multiple access/collision avoidance (CSMA/CA) that may be referred to as the Distributed Coordination Function (DCF). More generally, an apparatus 1502 having data for transmission senses the wireless medium to determine if the channel is already occupied. If the apparatus 1502 senses the channel is idle then the apparatus 1502 transmits prepared data. Otherwise, the apparatus 1502 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus comprises a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

Figure 18:
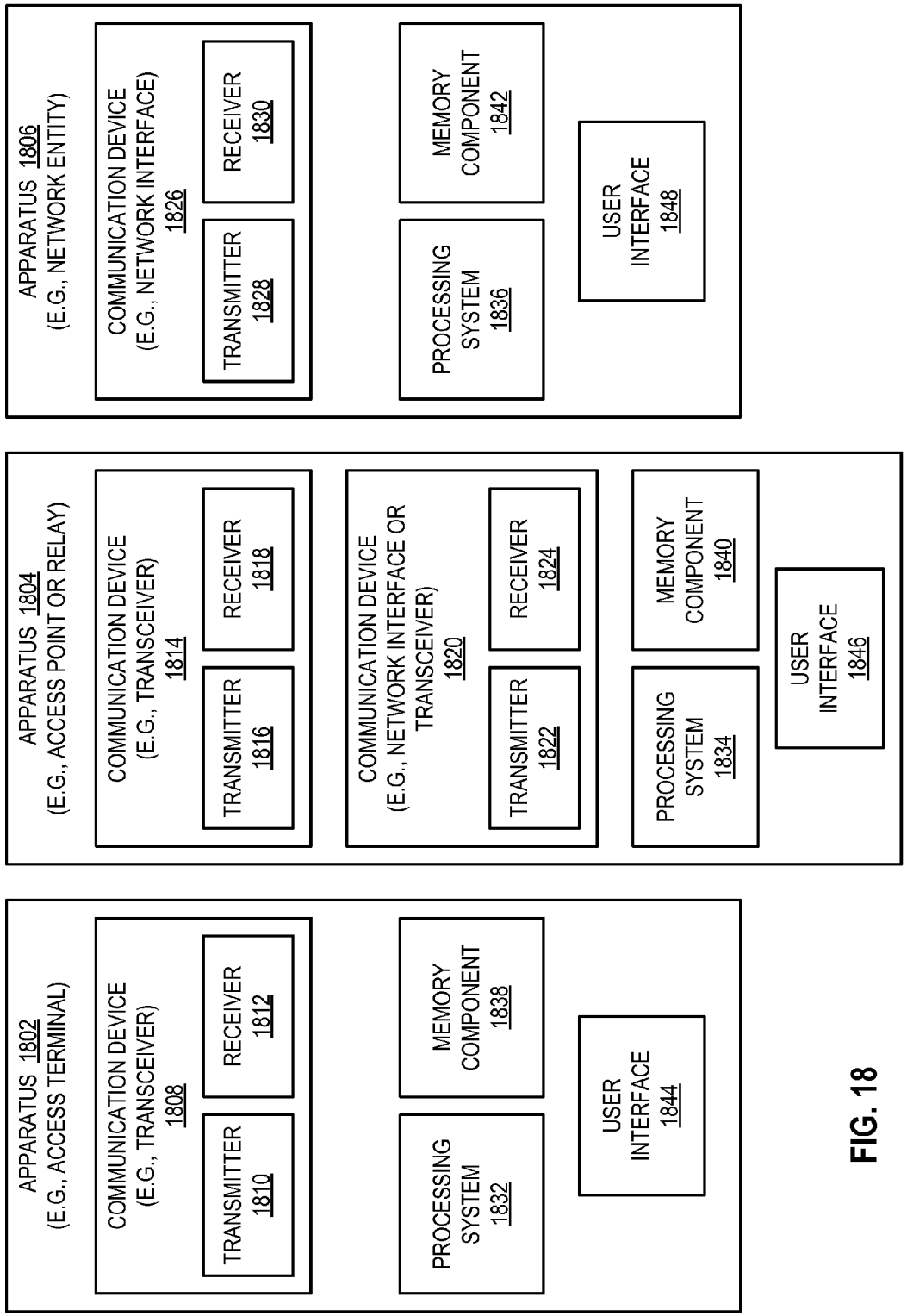
FIG. 18 is a simplified block diagram of several sample aspects of components that may be employed in communication nodes.
Figure 19:
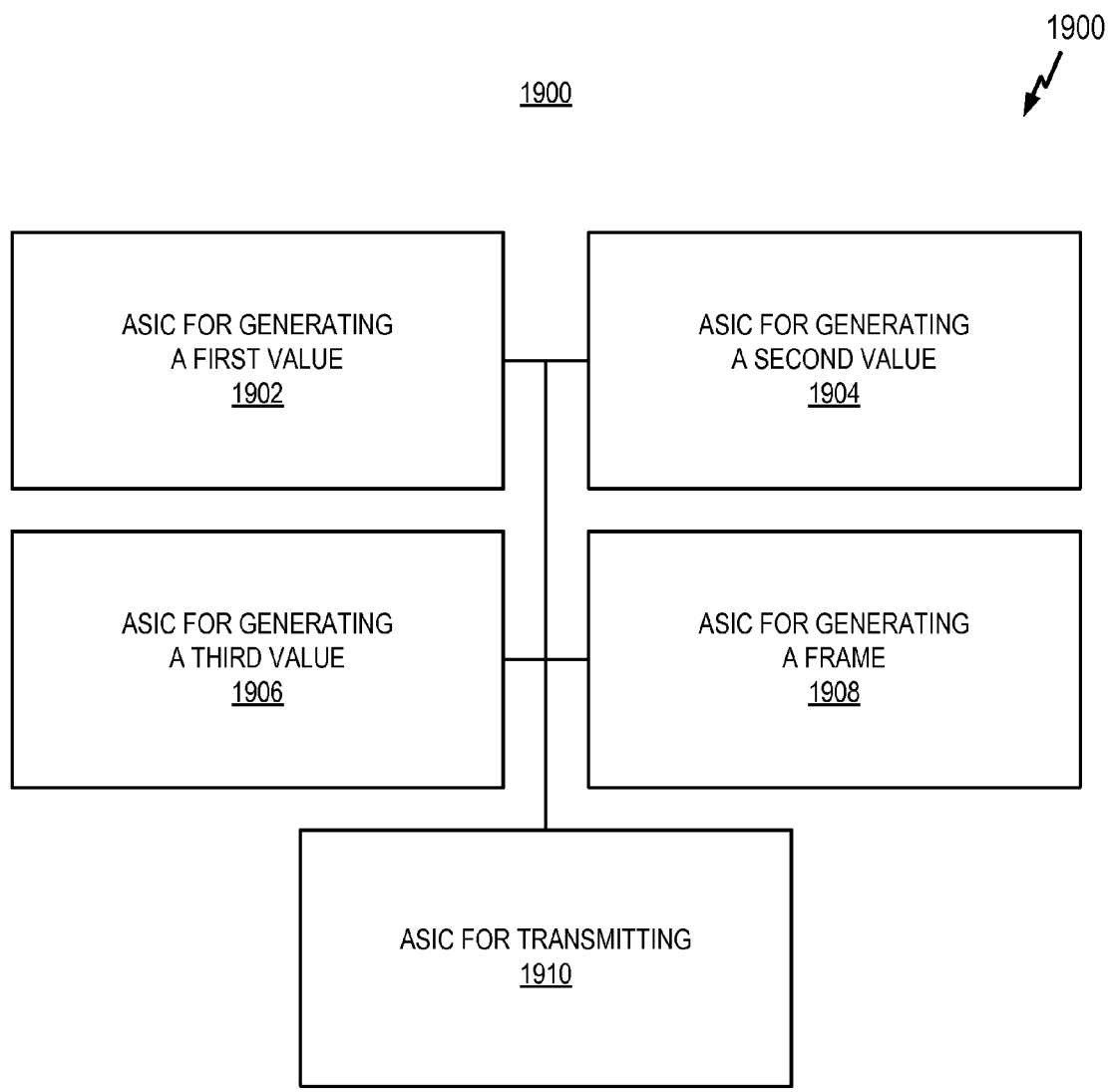
FIGS. 19-22 are simplified block diagrams of several sample aspects of apparatuses configured with functionality relating to reduced security overhead in accordance with some aspects of the disclosure.
Figure 20:
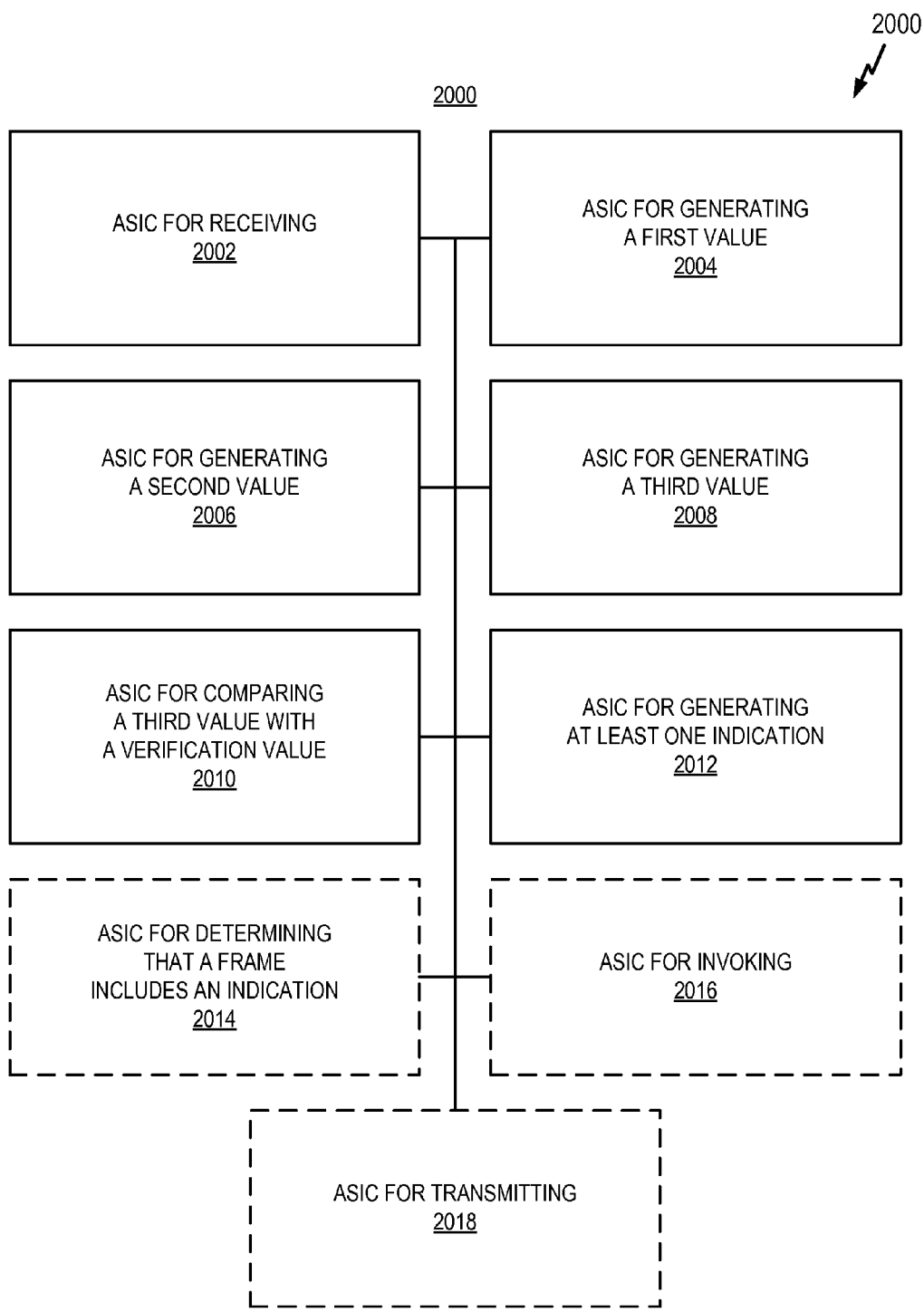
Figure 21:
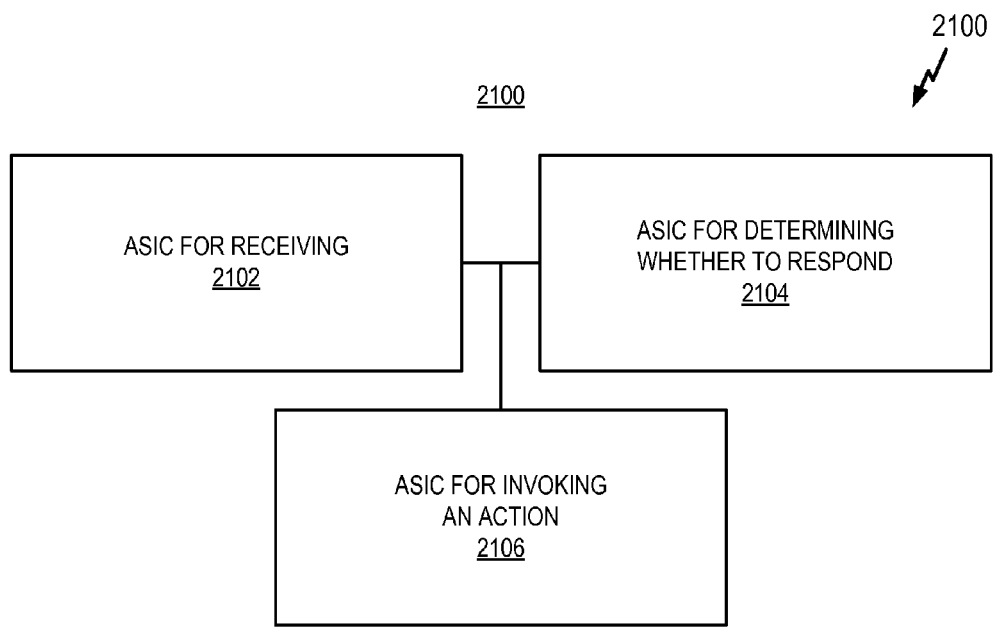
Figure 22:
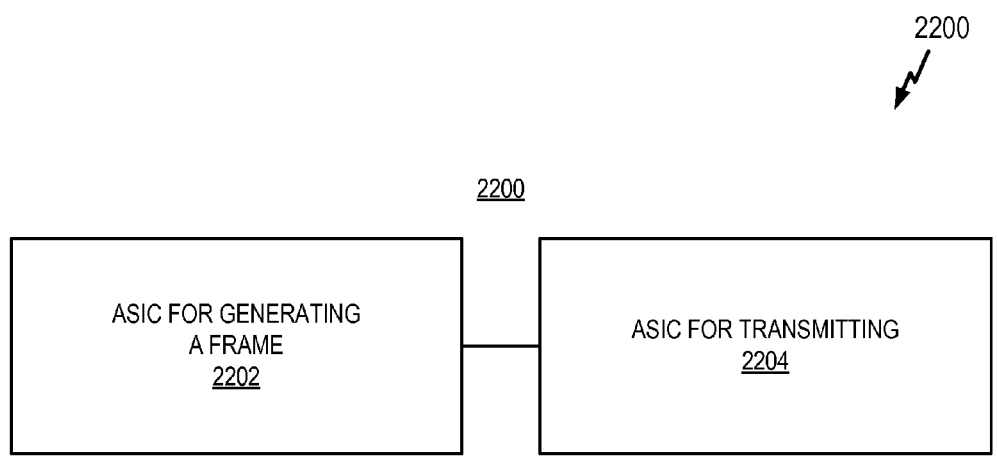

FIG. 18 illustrates several sample components (represented by corresponding blocks) that may be incorporated into an apparatus 1802, an apparatus 1804, and an apparatus 1806 (e.g., corresponding to an access terminal, an access point or relay, and a network entity, respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 1802 and the apparatus 1804 each include at least one wireless communication device (represented by the communication devices 1808 and 1814 (and the communication device 1820 if the apparatus 1804 is a relay)) for communicating with other nodes via at least one designated radio access technology. Each communication device 1808 includes at least one transmitter (represented by the transmitter 1810) for transmitting and encoding signals (e.g., messages, indications, information, and so on) and at least one receiver (represented by the receiver 1812) for receiving and decoding signals (e.g., messages, indications, information, pilots, and so on). Similarly, each communication device 1814 includes at least one transmitter (represented by the transmitter 1816) for transmitting signals (e.g., messages, indications, information, pilots, and so on) and at least one receiver (represented by the receiver 1818) for receiving signals (e.g., messages, indications, information, and so on). If the apparatus 1804 is a relay, each communication device 1820 includes at least one transmitter (represented by the transmitter 1822) for transmitting signals (e.g., messages, indications, information, pilots, and so on) and at least one receiver (represented by the receiver 1824) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 1804 comprises a network listen module.

The apparatus 1806 (and the apparatus 1804 if it is an access point) includes at least one communication device (represented by the communication device 1826 and, optionally, 1820) for communicating with other nodes. For example, the communication device 1826 may comprise a network interface that is configured to communicate with one or more network entities via a wire-based or wireless backhaul. In some aspects, the communication device 1826 may be implemented as a transceiver configured to support wire-based or wireless signal communication. This communication may involve, for example, sending and receiving: messages, parameters, or other types of information. Accordingly, in the example of FIG. 18, the communication device 1826 is shown as comprising a transmitter 1828 and a receiver 1830. Similarly, if the apparatus 1804 is an access point, the communication device 1820 may comprise a network interface that is configured to communicate with one or more network entities via a wire-based or wireless backhaul. As with the communication device 1826, the communication device 1820 is shown as comprising a transmitter 1822 and a receiver 1824.

The apparatuses 1802, 1804, and 1806 also include other components that may be used in conjunction with communication operations as taught herein. The apparatus 1802 includes a processing system 1832 for providing functionality relating to, for example, generating and/or processing frames as taught herein and for providing other processing functionality. The apparatus 1804 includes a processing system 1834 for providing functionality relating to, for example, generating and/or processing frames as taught herein and for providing other processing functionality. The apparatus 1806 includes a processing system 1836 for providing functionality relating to, for example, supporting communication between the apparatuses 1802 and 1804 as taught herein and for providing other processing functionality. The apparatuses 1802, 1804, and 1806 include memory devices 1838, 1840, and 1842 (e.g., each including a memory device), respectively, for maintaining information (e.g., thresholds, parameters, mapping information, and so on). In addition, the apparatuses 1802, 1804, and 1806 include user interface devices 1844, 1846, and 1848, respectively, for providing indications (e.g., audible and/or visual indications) to a user and/or for receiving user input (e.g., upon user actuation of a sensing device such a keypad, a touch screen, a microphone, and so on).

For convenience, the apparatus 1802 is shown in FIG. 18 as including components that may be used in the various examples described herein. In practice, the illustrated blocks may have different functionality in different aspects. For example, functionality of the block 1834 for supporting the implementation of FIG. 3 may be different as compared to functionality of the block 1834 for supporting the implementation of FIG. 6.

The components of FIG. 18 may be implemented in various ways. In some implementations, the components of FIG. 18 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1808, 1832, 1838, and 1844 may be implemented by processor and memory component(s) of the apparatus 1802 (e.g., by execution of appropriate code and/or by appropriate configuration of processor components). Similarly, some or all of the functionality represented by blocks 1814, 1820, 1834, 1840, and 1846 may be implemented by processor and memory component(s) of the apparatus 1804 (e.g., by execution of appropriate code and/or by appropriate configuration of processor components). Also, some or all of the functionality represented by blocks 1826, 1836, 1842, and 1848 may be implemented by processor and memory component(s) of the apparatus 1806 (e.g., by execution of appropriate code and/or by appropriate configuration of processor components).

The components described herein may be implemented in a variety of ways. Referring to FIGS. 19, 20, 21, and 22, apparatuses 1900, 2000, 2100, and 2200 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 1900 includes one or more modules that may perform one or more of the functions described above with regard to various figures. For example, an ASIC for generating a first value 1902 may correspond to, for example, a processing system as discussed herein. An ASIC for generating a second value 1904 may correspond to, for example, a processing system as discussed herein. An ASIC for generating a third value 1906 may correspond to, for example, a processing system as discussed herein. An ASIC for generating a frame 1908 may correspond to, for example, a processing system as discussed herein. An ASIC for transmitting 1910 may correspond to, for example, a transmitter as discussed herein.

The apparatus 2000 includes one or more modules that may perform one or more of the functions described above with regard to various figures. For example, an ASIC for receiving 2002 may correspond to, for example, a receiver as discussed herein. An ASIC for generating a first value 2004 may correspond to, for example, a processing system as discussed herein. An ASIC for generating a second value 2006 may correspond to, for example, a processing system as discussed herein. An ASIC for generating a third value 2008 may correspond to, for example, a processing system as discussed herein. An ASIC for comparing a third value with a verification value 2010 may correspond to, for example, a processing system as discussed herein. An ASIC for generating at least one indication 2012 may correspond to, for example, a transmitter as discussed herein. An ASIC for determining that a frame includes an indication 2014 may correspond to, for example, a processing system as discussed herein. An ASIC for invoking 2016 may correspond to, for example, a processing system as discussed herein. An ASIC for transmitting 2018 may correspond to, for example, a transmitter as discussed herein.

The apparatus 2100 includes one or more modules that may perform one or more of the functions described above with regard to various figures. For example, an ASIC for receiving 2102 may correspond to, for example, a receiver as discussed herein. An ASIC for determining whether to respond 2104 may correspond to, for example, a processing system as discussed herein. An ASIC for invoking an action 2106 may correspond to, for example, a processing system as discussed herein.

The apparatus 2200 includes one or more modules that may perform one or more of the functions described above with regard to various figures. For example, an ASIC for generating a frame 2202 may correspond to, for example, a processing system as discussed herein. An ASIC for transmitting 2204 may correspond to, for example, a transmitter as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatuses 1900-2200 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1900 may comprise a single device (e.g., with components 1902-1910 comprising different sections of an ASIC). As another specific example, the apparatus 1900 may comprise several devices (e.g., with the components 1902-1908 comprising one ASIC, and the component 1910 comprising another ASIC).

In addition, the components and functions represented by FIGS. 19-22 as well as other components and functions described herein, may be implemented using any suitable means. Such means are implemented, at least in part, using corresponding structure as taught herein. For example, the components described above in conjunction with the "ASIC for" components of FIGS. 19-22 correspond to similarly designated "means for" functionality. Thus, one or more of such means is implemented using one or more of processor components, integrated circuits, or other suitable structure as taught herein in some implementations. Several examples follow.

In some implementations, communication device structure such as a transceiver is configured to embody the functionality of a means for receiving. For example, in some implementations, this structure is programmed or designed to invoke a receive operation. In addition, in some implementations, this structure is programmed or designed to process (e.g., demodulate and decode) any signals received as a result of the receive operation. In addition, in some implementations, this structure is programmed or designed to output data (e.g., a data unit, a frame, a request, an indication, or other information) extracted from the received signals as a result of the processing. Typically, the communication device structure comprises a wireless-based transceiver device or wire-based transceiver device.

In some implementations, communication device structure such as a transceiver is configured to embody the functionality of a means for transmitting. For example, in some implementations, this structure is programmed or designed to obtain data (e.g., a data unit, a frame, a request, a pilot, an indication, or other information) to be transmitted (e.g., from a memory device or another component). In addition, in some implementations, this structure is programmed or designed to process (e.g., modulate and encode) the obtained data. In addition, in some implementations, this structure is programmed or designed to couple the processed data to one or more antennas for transmission. Typically, the communication device structure comprises a wireless-based transceiver device or wire-based transceiver device.

In some implementations, processing system structure such as an ASIC or a programmable processor is configured to embody the functionality of a means for determining whether to respond. In some implementations, this structure is programmed or designed to receive frame information (e.g., from a memory device or another component). In some implementations, this structure is programmed or designed to process the received frame information to control one or more response operations. For example, in some implementations, a determination is made as to whether to respond to the frame irrespective of considering a FCS. In some implementations, this structure is programmed or designed to then output an indication indicative of the results of the processing (e.g., indicative of whether to respond to the frame).

In some implementations, processing system structure such as an ASIC or a programmable processor is configured to embody the functionality of a means for generating a value. In some implementations, this structure is programmed or designed to receive one or more input parameters (e.g., from a memory device or another component). In some implementations, this structure is programmed or designed to perform an operation based on a defined criteria and the received input parameters. In some implementations, the structure generates an ICV (e.g., as discussed above in conjunction with block 204 of FIG. 2). In some implementations, the structure generates an FCS (e.g., as discussed above in conjunction with block 208 of FIG. 2). In some implementations, the structure generates a merged ICV and FCS value (e.g., as discussed above in conjunction with block 214 of FIG. 2). In some implementations, this structure is programmed or designed to then output the generated value (e.g., by storing the value in memory or sending the value to another component).

In some implementations, processing system structure such as an ASIC or a programmable processor is configured to embody the functionality of a means for generating a frame. In some implementations, this structure is programmed or designed to receive information to be included in a frame (e.g., from a memory device or another component). In some implementations, this structure is programmed or designed to process the received information to provide the information in a designated frame format. In some implementations, this structure is programmed or designed to then output an indication indicative of the results of the processing (e.g., a formatted frame).

In some implementations, processing system structure such as an ASIC or a programmable processor is configured to embody the functionality of a means for comparing a third value with a verification value. In some implementations, this structure is programmed or designed to receive information to be compared (e.g., from a memory device or another component). In some implementations, this structure is programmed or designed to compare the received information. In some implementations, this structure is programmed or designed to then output an indication indicative of the results of the comparison (e.g., to a memory device or another component).

In some implementations, processing system structure such as an ASIC or a programmable processor is configured to embody the functionality of a means for generating at least one indication. In some implementations, this structure is programmed or designed to receive information (e.g., from a memory device or the means for comparing). In some implementations, this structure is programmed or designed to process the received information to determine whether a received frame is associated with an error. In some implementations, this structure is programmed or designed to then output an indication indicative of the results of the processing (e.g., to a memory device or another component).

In some implementations, processing system structure such as an ASIC or a programmable processor is configured to embody the functionality of a means for determining that a frame includes an indication. In some implementations, this structure is programmed or designed to receive frame information (e.g., from a memory device or a receiver). In some implementations, this structure is programmed or designed to process the received frame information to determine whether the received frame includes an indication that the frame comprises a verification value. In some implementations, this structure is programmed or designed to then output an indication indicative of the results of the determination (e.g., to a memory device or another component).

In some implementations, processing system structure such as an ASIC or a programmable processor is configured to embody the functionality of a means for invoking. In some implementations, this structure is programmed or designed to receive information indicative of whether a received frame includes an indication (e.g., from a memory device or the means for determining that a frame includes an indication). In some implementations, this structure is programmed or designed to process the received information to determine whether to invoke other operations. For example, in some cases, certain operations are invoked if the frame does include a particular indication. In some implementations, this structure is programmed or designed to then output an indication indicative of the results of the determination (e.g., to a memory device or another component that performs the operations).

In some implementations, processing system structure such as an ASIC or a programmable processor is configured to embody the functionality of a means for invoking an action. In some implementations, this structure is programmed or designed to receive information indicative of whether there will be a response to a received frame (e.g., from a memory device or the means for determining whether to respond). In some implementations, this structure is programmed or designed to, based on the received information, invoke the transmission of an acknowledgement or invoke the dropping of a frame. In some implementations, this structure is programmed or designed to then output an indication indicative of the results of the determination (e.g., to a memory device or another component that performs the operations).

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular aspects are described herein, many variations and permutations of these aspects fall within the scope of the disclosure.

Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the description.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
a processing system configured to:
 generate a first value based on a subset of a data set that will be transmitted,
 generate a second value based on the first value and the data set that will be transmitted,
 generate a third value, based on the first value and the second value, to reduce overhead for wireless communication, wherein the generation of the third value comprises:
  using a combination of a first subset of the first value and the second value as a first subset of the third value; and
  using a second subset of the first value as a second subset of the third value, and
 generate a frame comprising the data set that will be transmitted and the third value; and
an interface configured to output the frame for transmission.

2. The apparatus of claim 1, wherein:
the first value comprises an integrity check value (ICV); and the second value comprises a frame check sequence (FCS).

3. The apparatus of claim 1, wherein:
the generation of the first value comprises executing a first type of verification algorithm that uses the subset of the data set; and
the generation of the second value comprises executing a second type of verification algorithm that uses the first value and the data set.

4. The apparatus of claim 1, wherein the generation of the third value comprises performing a hashing operation based on the first value and the second value.

5. The apparatus of claim 1, wherein the generation of the third value comprises exclusive-ORing (XORing) the first subset of the first value with the second value.

6. The apparatus of claim 1, wherein the generation of the frame comprises including the third value but not the first and second values in the frame.

7. The apparatus of claim 1, wherein the data set comprises at least one of: a data payload, an initialization vector (IV), or a media access control (MAC) header.

8. The apparatus of claim 1, wherein the subset of the data set comprises at least one of: a data payload, an initialization vector(IV), or a subset of a media access control (MAC) header.

9. The apparatus of claim 1, wherein the generation of the frame comprises including, in the frame, an indication that the frame comprises the third value.

10. A method of wireless communication, comprising:
generating a first value based on a subset of a data set that will be transmitted;
generating a second value based on the first value and the data set that will be transmitted;
generating a third value, based on the first value and the second value, to reduce overhead for wireless communication, wherein the generation of the third value comprises:
using a combination of a first subset of the first value and the second value as a first subset of the third value; and
using a second subset of the first value as a second subset of the third value;
generating a frame comprising the data set that will be transmitted and the third value; and
outputting the frame for transmission.

11. The method of claim 10, wherein:
the first value comprises an integrity check value (ICV); and
the second value comprises a frame check sequence (FCS).

12. The method of claim 10, wherein:
the generation of the first value comprises executing a first type of verification algorithm that uses the subset of the data set; and
the generation of the second value comprises executing a second type of verification algorithm that uses the first value and the data set.

13. The method of claim 10, wherein the generation of the third value comprises performing a hashing operation based on the first value and the second value.

14. The method of claim 10, wherein the generation of the third value comprises exclusive-ORing (XORing) the first subset of the first value with the second value.

15. The method of claim 10, wherein the generation of the frame comprises including the third value but not the first and second values in the frame.

16. The method of claim 10, wherein the data set comprises at least one of: a data payload, an initialization vector (IV), or a media access control (MAC) header.

17. The method of claim 10, wherein the subset of the data set comprises at least one of: a data payload, an initialization vector(IV), or a subset of a media access control (MAC) header.

18. A wireless device, comprising:
a processing system configured to:
generate a first value based on a subset of a data set that will be transmitted,
generate a second value based on the first value and the data set that will be transmitted,
generate a third value, based on the first value and the second value, to reduce overhead for wireless communication, wherein the generation of the third value comprises:
using a combination of a first subset of the first value and the second value as a first subset of the third value, and
using a second subset of the first value as a second subset of the third value, and
generate a frame comprising the data set that will be transmitted and the third value; and
a transmitter configured to transmit the frame.

* * * * *